(12) United States Patent
Lezec et al.

(10) Patent No.: US 10,720,993 B2
(45) Date of Patent: Jul. 21, 2020

(54) METASURFACE OPTICAL PULSE SHAPER FOR SHAPING AN OPTICAL PULSE IN A TEMPORAL DOMAIN

(71) Applicant: Government of the United States of America, as represented by the Secretary of Commerce, Gaithersburg, MD (US)

(72) Inventors: Henri J. Lezec, Silver Spring, MD (US); Amit Agrawal, Bethesda, MD (US); Wenqi Zhu, Arlington, VA (US); Cheng Zhang, Gaithersburg, MD (US); Shawn Divitt, Gaithersburg, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 16/409,059

(22) Filed: May 10, 2019

(65) Prior Publication Data
US 2019/0386749 A1    Dec. 19, 2019

Related U.S. Application Data

(60) Provisional application No. 62/670,590, filed on May 11, 2018.

(51) Int. Cl.
*H04B 10/2513*    (2013.01)
*H04B 10/071*    (2013.01)
(Continued)

(52) U.S. Cl.
CPC ..... *H04B 10/25137* (2013.01); *H04B 10/071* (2013.01); *G01J 3/02* (2013.01);
(Continued)

(58) Field of Classification Search
CPC ............ H04B 10/25137; H04B 10/071; H04B 10/2513; H01L 27/146; H01L 21/66;
(Continued)

(56) References Cited

U.S. PATENT DOCUMENTS 5,220,163 A * 6/1993 Toughlian .............. G02B 26/06
250/201.9
5,757,449 A * 5/1998 Nishizaki ............. G02B 5/1857
349/104

(Continued)

OTHER PUBLICATIONS

"Ultrafast optical pulse shaping using dielectric metasurfaces", Shawn Divitt.et al., Science Report, published online May 2, 2019. (Year: 2019).*

(Continued)

*Primary Examiner* — Abbas H Alagheband
(74) *Attorney, Agent, or Firm* — Office of Chief Counsel for National Institute of Standards and Technology

(57) ABSTRACT

A metasurface optical pulse shaper includes a metasurface with superpixels disposed on an entry side of the metasurface and a wire grid polarizer disposed on an exit surface of the metasurface for controlling a phase, amplitude, or polarization of an optical pulse, wherein the metasurface in combination with dispersers provide for optical shaping of the optical pulse. A process for optically changing a pulse shape includes dispersing a primary optical pulse; separating spatially, by frequency, primary frequency waves; changing, by superpixels, a relative phase of the primary frequency waves and producing phase waves that are separated spatially by frequency and phase; and producing a plurality of shaped frequency waves such that, from an individual phase wave, a shaped frequency wave is produced that separated spatially by frequency and phase, such that a superposition
(Continued)

of shaped frequency waves produce a shaped optical pulse that has pulse shape that is different than the primary optical pulse.

20 Claims, 24 Drawing Sheets

(51) Int. Cl.
   *G02F 1/335*     (2006.01)
   *H04N 13/218*    (2018.01)
   *G01J 3/02*      (2006.01)
   *H04N 5/369*     (2011.01)

(52) U.S. Cl.
   CPC .............. *G02F 1/335* (2013.01); *H04N 5/369* (2013.01); *H04N 13/218* (2018.05)

(58) Field of Classification Search
   CPC ......... H01L 21/67; H01L 25/00; H04N 5/225; H04N 5/335; H04N 13/218; H04N 5/369; G01N 21/88; G01N 21/95; G01J 3/02; G01J 5/00; G02B 21/32; G02F 1/335; G06F 3/043
   USPC ....................................................... 398/192
   See application file for complete search history.

(56) References Cited

U.S. PATENT DOCUMENTS

| | | | | |
|---|---|---|---|---|
| 9,404,804 | B1* | 8/2016 | Liu | G01J 5/0014 |
| 10,033,948 | B2* | 7/2018 | Rephaeli | G02B 13/0085 |
| 10,312,389 | B2* | 6/2019 | Chanda | H01L 31/0543 |
| 2009/0303573 | A1* | 12/2009 | Hillis | B82Y 20/00 |
| | | | | 359/326 |
| 2011/0176577 | A1* | 7/2011 | Bandara | G01J 3/36 |
| | | | | 374/121 |
| 2014/0286367 | A1* | 9/2014 | Scofield | H01S 5/1042 |
| | | | | 372/43.01 |
| 2015/0116721 | A1* | 4/2015 | Kats | G01J 3/26 |
| | | | | 356/454 |
| 2015/0185199 | A1 | 7/2015 | Joo et al. | |
| 2015/0322589 | A1* | 11/2015 | Busnaina | B23K 31/00 |
| | | | | 204/477 |
| 2016/0077261 | A1* | 3/2016 | Arbabi | G02B 5/3025 |
| | | | | 359/493.01 |
| 2016/0132187 | A1* | 5/2016 | Lu | G06K 9/0002 |
| | | | | 345/177 |
| 2016/0276979 | A1* | 9/2016 | Shaver | H01Q 19/104 |
| | | | | 219/104 |
| 2016/0284886 | A1* | 9/2016 | Han | H01L 31/02363 |
| 2016/0370568 | A1* | 12/2016 | Toussaint | C03C 17/3657 |
| 2017/0212126 | A1 | 7/2017 | Emili et al. | |
| 2018/0217473 | A1* | 8/2018 | Frank | G02F 1/335 |
| 2018/0341090 | A1* | 11/2018 | Devlin | G02B 13/14 |
| 2019/0104296 | A1* | 4/2019 | Kovacovsky | H04N 5/374 |
| 2019/0178720 | A1* | 6/2019 | Padilla | G01J 5/524 |
| 2019/0229223 | A1* | 7/2019 | Chanda | G01N 21/553 |
| 2019/0304851 | A1* | 10/2019 | Smith | G01N 21/9501 |
| 2019/0326454 | A1* | 10/2019 | Greer | H01L 31/036 |

OTHER PUBLICATIONS

"Ultrafast Optics", Andrew Weiner et al., Purdue University, Wiley Series in pure and applied optics, pp. 377-436, Feb. 25, 2009 (Year: 2009).*

"Femtosecond pulse shaping by ultrathin plasmonic nnetasurfaces", Eesa Rahimi et al., Journal of the Optical Society of America B, vol. 33, No. 2 Oct. 27, 2015 (Year: 2015).*

"Flat optics with designer nnetasurfaces", Nanfang Yu, et al., by nature materials, published Jan. 23, 2014, (Year: 2014).*

Dielectric metasurfaces for complete control of phase and polarization with subwavelength spatial resolution and high transmission, Amir Arbabi et al., by nature nanotechnology Aug. 31, 2015, (Year: 2015).*

Divitt, S., et al, "Ultrafast optical pulse shaping using dielectric metasurfaces", Science, 2019.

Arbabi, A., et al., "Dielectric metasurfaces for complete control of phase and polarization with subwavelength spatial resolution and high transmission", Nature Nanotechnology, 2015, p. 937-943, vol. 10.

Yu, N., et al., "Flat optics with designer metasurfaces", Nature Materials, 2014, p. 139-150, vol. 13.

Weiner, A., et al., "Ultrafast Optics", 2009.

Rahimi, E., et al.,"Femtosecond pulse shaping by ultrathin plasmonic metasurfaces", Journal of the Optical Society of America, 2016, p. A1-A7, vol. 33 No. 2.

* cited by examiner (A)

(B)

(A)

(B)

(A) <u>216</u>, <u>234</u>

(B) <u>216</u>, <u>234</u>

METASURFACE OPTICAL PULSE SHAPER FOR SHAPING AN OPTICAL PULSE IN A TEMPORAL DOMAIN

CROSS REFERENCE TO RELATED APPLICATIONS

The application claims priority to U.S. Provisional Patent Application Ser. No. 62/670,590 filed May 11, 2018, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce and under Agreement No. 70NANB14H209 awarded by NIST. The Government has certain rights in the invention. Licensing inquiries may be directed to the Technology Partnerships Office, NIST, Gaithersburg, Md., 20899; voice (301) 301-975-2573; email tpo@nist.gov.

BRIEF DESCRIPTION

Disclosed is a metasurface optical pulse shaper for shaping a primary optical pulse in a temporal domain, the metasurface optical pulse shaper comprising: a metasurface comprising: a plurality of superpixels that: receives a plurality of primary frequency waves, the primary frequency waves being separated spatially by frequency, and individual primary frequency waves comprise a primary frequency and a primary phase; changes a relative phase of the primary frequency waves to produce shaped phases; and produces, from the primary frequency waves, a plurality of phase waves that are separated spatially by frequency and phase, individual phase waves comprising: the primary frequency of the primary frequency wave from which the phase wave was produced; and a shaped phase, wherein at least one of the plurality of shaped phases is different among the shaped phases; and a substrate comprising: an entry surface that receives a plurality of phase waves from the superpixels; and an exit surface that communicates the phase waves, the substrate producing a plurality of shaped frequency waves such that, from an individual phase wave, a shaped frequency wave is produced and comprises: the primary frequency, the shaped phase, and a shaped polarization, the shaped frequency waves being separated spatially by frequency and phase; the superpixels being disposed on the entry surface, and the primary optical pulse comprising a primary shape.

Disclosed is a process for optically changing a pulse shape with a metasurface optical pulse shaper, the process comprising: dispersing a primary optical pulse into a plurality of primary frequency waves that comprises a primary frequency and a primary phase; separating spatially by frequency the primary frequency waves; receiving, by the superpixels, the primary frequency waves, individual superpixels receiving an individual primary frequency wave; changing, by the superpixels, a relative phase of the primary frequency waves to produce shaped phases; and producing, by the superpixels from the primary frequency waves, a plurality of phase waves that are separated spatially by frequency and phase, individual phase waves comprising: the primary frequency of the primary frequency wave from which the phase wave was produced; and a shaped phase, wherein at least one of the plurality of shaped phases is different among the shaped phases; and producing, by the substrate, a plurality of shaped frequency waves such that, from an individual phase wave, a shaped frequency wave is produced and comprises: the primary frequency, the shaped phase, and a shaped polarization, the phase waves and shaped frequency waves being separated spatially by frequency and phase, such that a superposition of the shaped frequency waves would produce a shaped optical pulse that comprises a secondary pulse shape, the primary optical pulse comprising a primary shape that is different than the secondary pulse shape.

BRIEF DESCRIPTION OF THE DRAWINGS

The following description should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a metasurface optical pulse shaper (MOPS) temporally shapes an optical pulse such as an ultrafast laser pulse. The metasurface optical pulse shaper can include a grating and mirror for spatially separating spectral components of the optical pulse. A metasurface of the metasurface optical pulse shaper can be disposed in a focus of the mirror for controlling an amplitude, phase, or polarization of spectral components. Advantageously and unexpectedly, the metasurface replaces and overcomes technical limitations of a conventional spatial light modulator (SLM). A shaped disperser can include a grating and mirror for producing a shaped optical pulse with a pulse shape that differs from the primary optical pulse.

Ultrafast laser pulse shaping is conventionally accomplished by controlling an amplitude, phase, or polarization of light by a spatial light modulator (SLM) in Fourier-transform pulse shaping. The metasurface optical pulse shaper overcomes technical limitations of a conventional SLM that include limited spectral resolution offered by an SLM due to the relatively small total size and relatively large pixel size. The metasurface optical pulse shaper provides lower cost, larger total size, smaller pixel size, higher diffraction efficiency, and higher damage threshold than a conventional SLM. It is contemplated that metasurface optical pulse shaper can control individual frequency comb lines in a wide pulse spectrum pulse train and can control independently the amplitude through polarization and phase of individual spectral components of an ultrafast pulse. Moreover, the metasurface of the metasurface optical pulse shaper can have nanopillars arranged in superpixels that provide small structures, each sized on the order of 100 nanometers, which affect the amplitude, phase, or polarization of light communicating through the metasurface. A shape and size of the nanopillars are controllable during fabrication, e.g., by electron beam lithography. Spectral components produced from the primary optical pulse can be selected in a spatial distribution, and an arrangement or property, e.g., size or shape of the nanopillars, can be made according to select amplitude, phase, or polarization for each spectral component. Spectral components can be combined, e.g., by a grating and mirror. The amplitude or phase of spectral components and shape of the shaped optical pulse are related through a Fourier transform. In addition, a subwavelength half-wave plate for each spectral component is provided such that the metasurface provides independent control of amplitude and phase. Disposing a plurality of metasurfaces in series provides synthesis of a Taylor series for phase and dynamic control.

Figure 1:
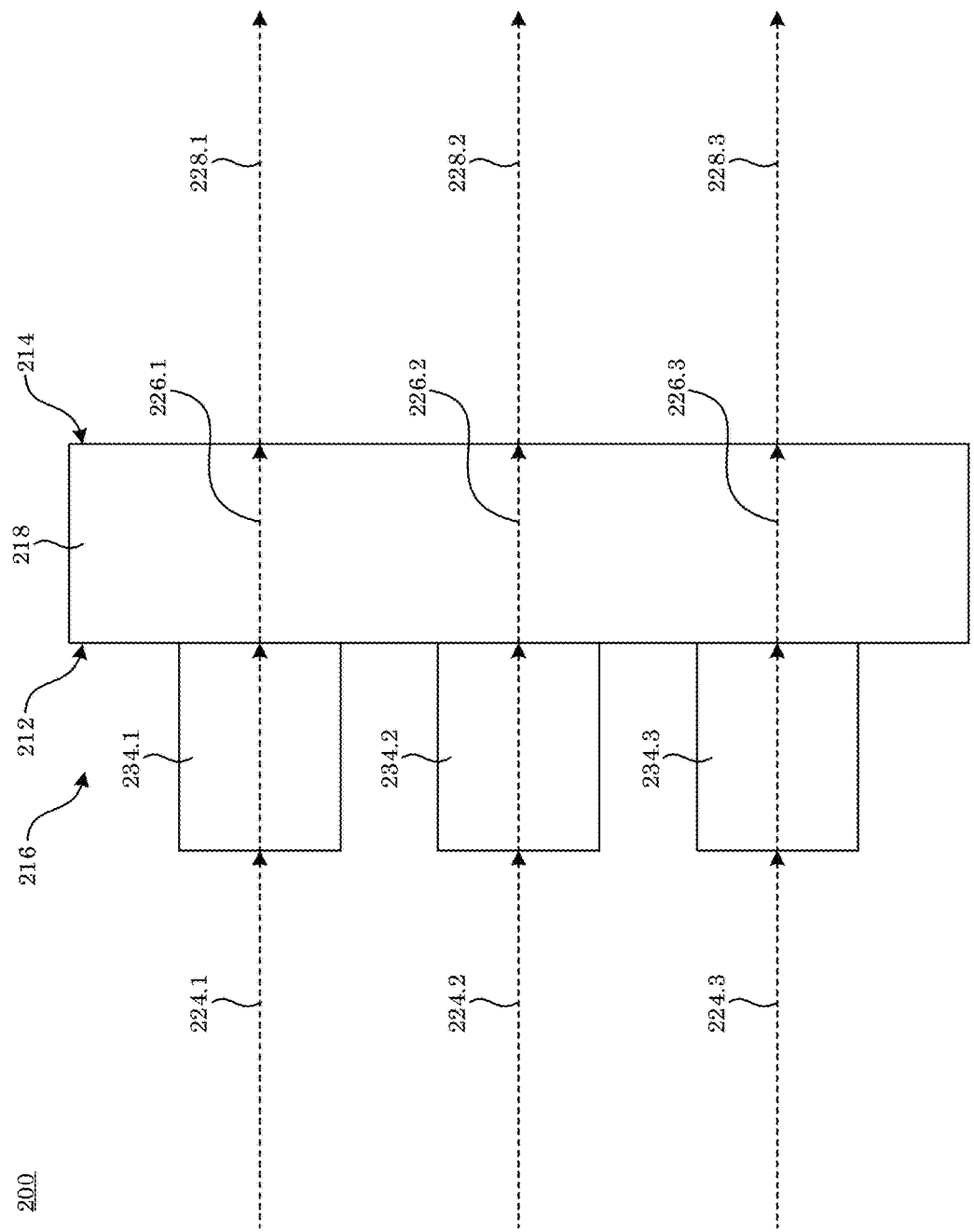
FIG. 1 shows a metasurface optical pulse shaper.

In an embodiment, with reference to FIG. 1, metasurface optical pulse shaper 200 shapes primary optical pulse 210 in a temporal domain. Metasurface optical pulse shaper 200 includes a metasurface 216. Metasurface 216 includes a plurality of superpixels 234. Superpixels 234 receive a plurality of primary frequency waves 224, primary frequency waves 224 being separated spatially by frequency, and individual primary frequency waves 224 include a primary frequency and a primary phase. Superpixels 234 change a relative phase of primary frequency waves 224 to produce shaped phases; and produce, from primary frequency waves 224, a plurality of phase waves 226 that are separated spatially by frequency and phase. Individual phase waves 226 include the primary frequency of the primary frequency wave 224 from which the individual phase wave 226 was produced and also includes a shaped phase, wherein at least one of the plurality of shaped phases is different among the shaped phases. Metasurface 216 of metasurface optical pulse shaper 200 also includes substrate 218. Substrate 218 includes entry surface 212 that receives a plurality of phase waves 226 from superpixels 234; and exit surface 214 that communicates phase waves 226. Substrate 218 produces a plurality of shaped frequency wave 228 such that, from an individual phase wave 226, a shaped frequency wave 228 is produced and comprises: the primary frequency, the shaped phase, and a shaped polarization, wherein shaped frequency waves 228 are separated spatially by frequency and phase. Here, superpixels 234 are disposed on entry surface 212, and primary optical pulse 210 includes a primary shape.

Figure 2:
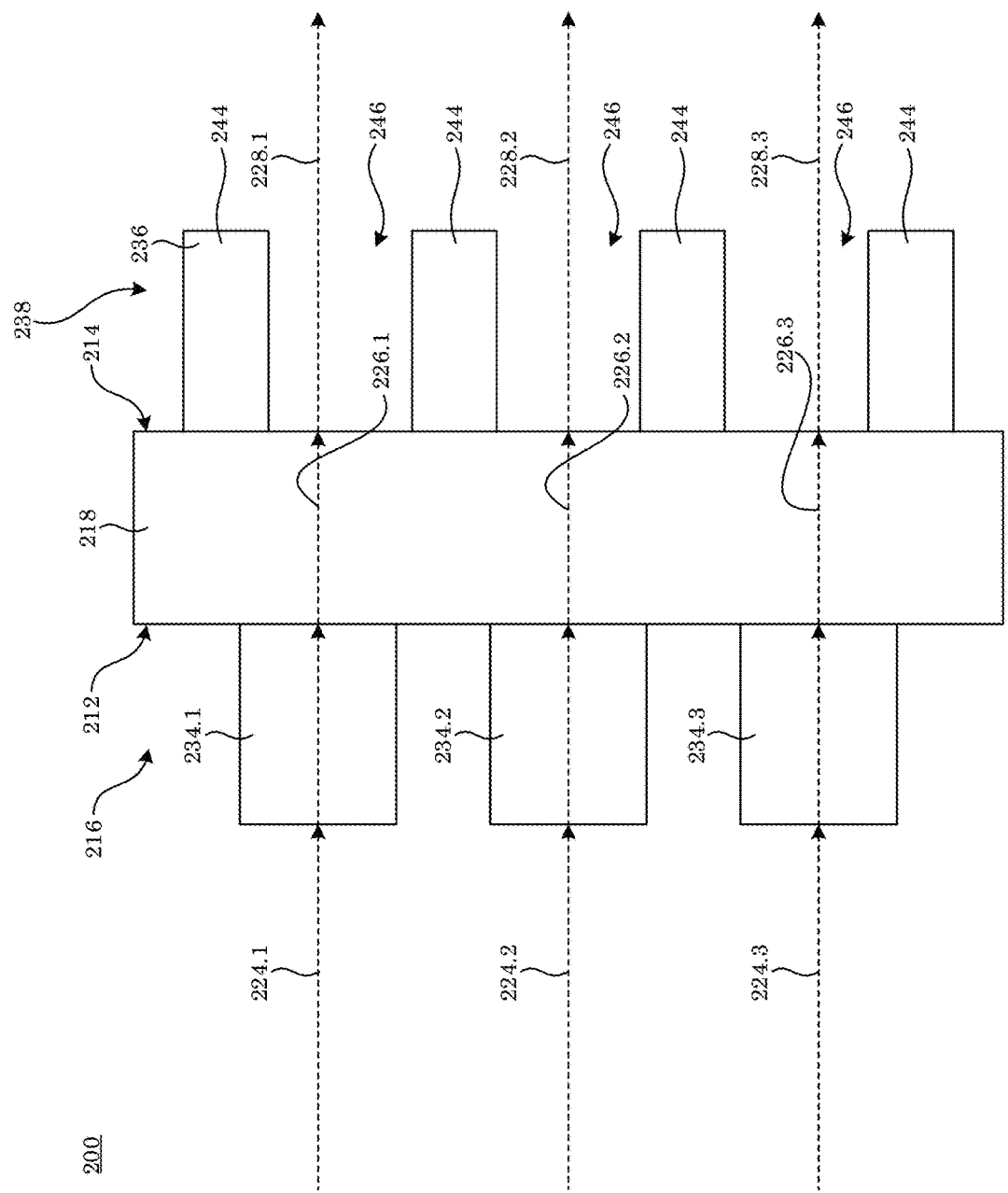
FIG. 2 shows a metasurface optical pulse shaper.

In an embodiment, with reference to FIG. 2, metasurface optical pulse shaper 200 includes wire grid polarizer 236 disposed on exit surface 214 of substrate 218. Substrate 218 is interposed between wire grid polarizer 236 and superpixels 234. Wire grid polarizer 236 includes an array of parallel, elongated elements 244 disposed on exit surface 214; and elongated, parallel exit slits 246 occurring between and bounded by neighboring elements 244. Wire grid polarizer 236 receives phase waves 226 from substrate 218; controls an amplitude of individual phase waves 226; and produces shaped frequency waves 228 such that shaped frequency waves 228 are separated spatially by frequency, phase, and amplitude.

Figure 3:
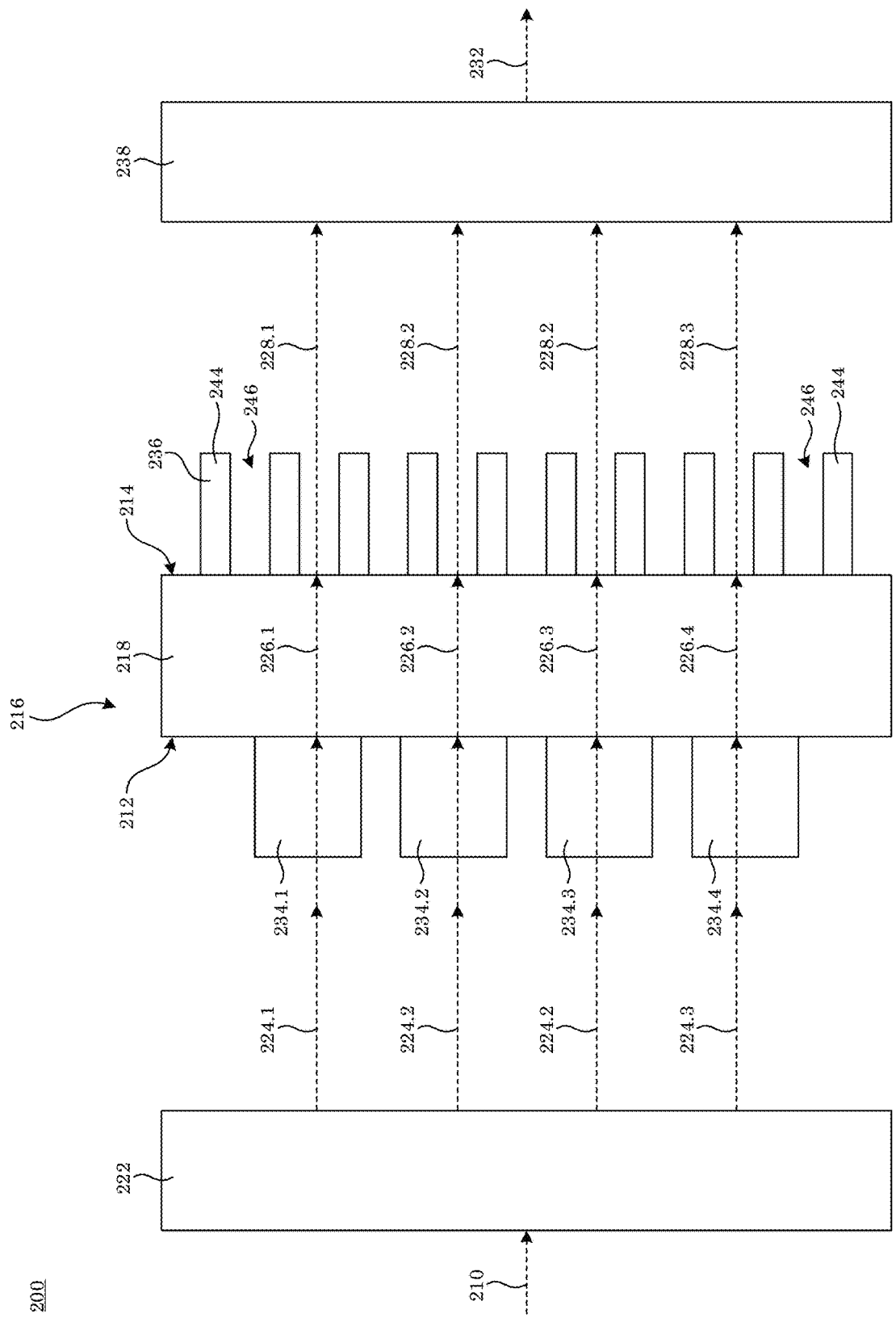
FIG. 3 shows a metasurface optical pulse shaper.

In an embodiment, with reference to FIG. 3. metasurface optical pulse shaper 200 includes primary disperser 222 in optical communication with superpixels 234. Primary disperser 222 receives primary optical pulse 210; spatially disperses primary optical pulse 210 according to frequency; and produces, from primary optical pulse 210, primary frequency waves 224. According to an embodiment, with reference to FIG. 5, primary disperser 222 includes grating 240 that receives primary optical pulse 210; spatially disperses primary optical pulse 210 according to frequency; and produces, from primary optical pulse 210, primary frequency waves 224. Primary disperser 222 also includes mirror 242 that receives, from grating 240, primary frequency waves 224; and focuses primary frequency waves 224 into a focal plane such that superpixels 234 receive primary frequency waves 224 in the focal plane of mirror 242.

In an embodiment, with reference to FIG. 3, metasurface optical pulse shaper 200 includes shaped disperser 238 in optical communication with exit surface 214 of metasurface 216. Shaped disperser 238 receives shaped frequency waves 228 from metasurface 216; spatially combines shaped frequency waves 228; and produces, from combined shaped frequency waves 228, shaped optical pulse 232. Shaped optical pulse 232 includes a secondary shape that is different from the primary shape of primary optical pulse 210.

Figure 5:
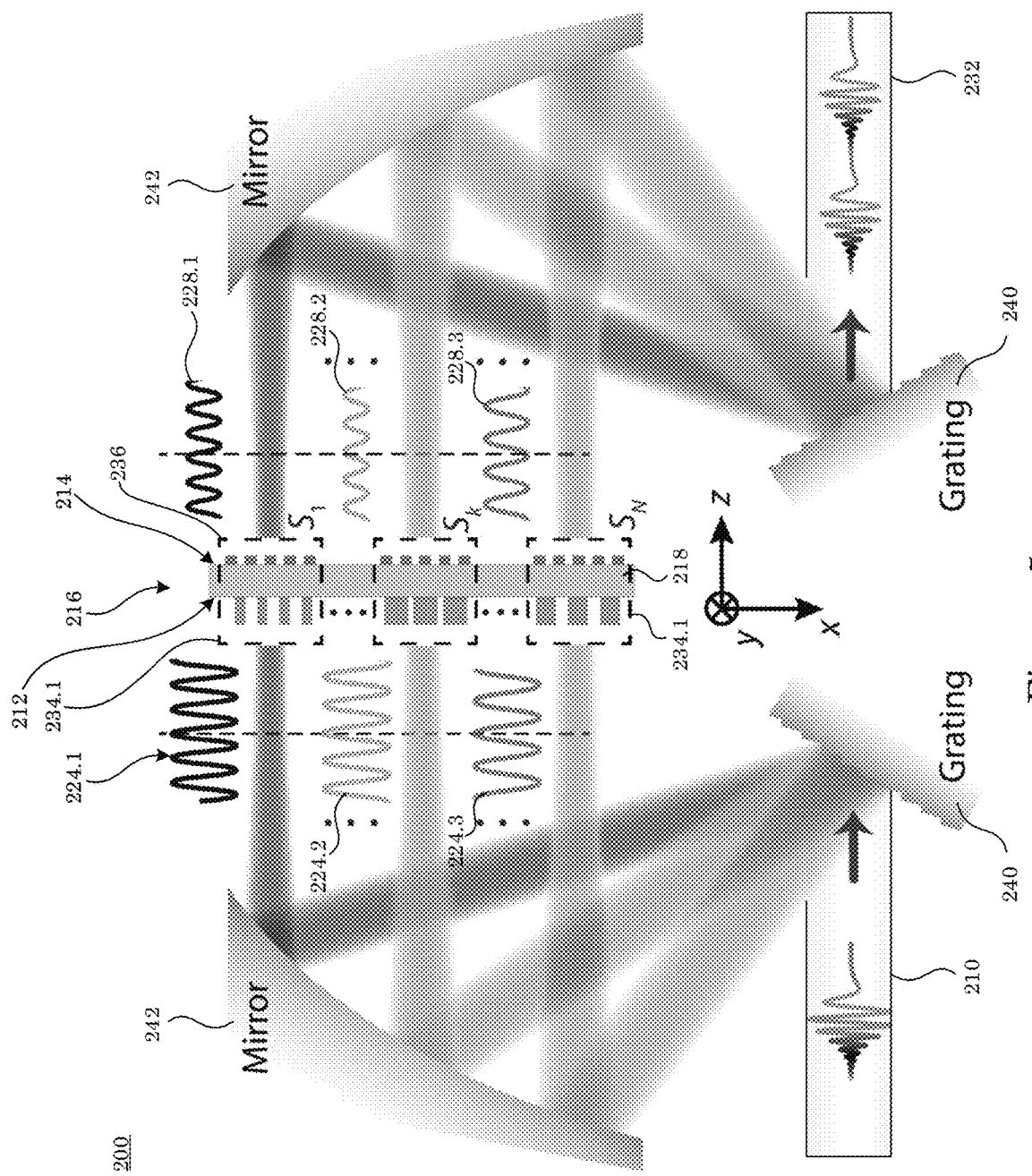
FIG. 5 shows a metasurface optical pulse shaper.

In an embodiment, with reference to FIG. 5, shaped disperser 238 includes mirror 242 that receives, from metasurface 216, shaped frequency waves 228; and spatially focuses shaped frequency waves 228 into a focal plane. Grating 240 of shaped disperser 238 receives, from mirror 242, shaped frequency waves 228 in the focal plane of mirror 242 with shaped frequency waves 228 spatially overlapping; spatially combines shaped frequency waves 228; and produces, from shaped frequency waves 228, shaped optical pulse 232.

Figure 4:
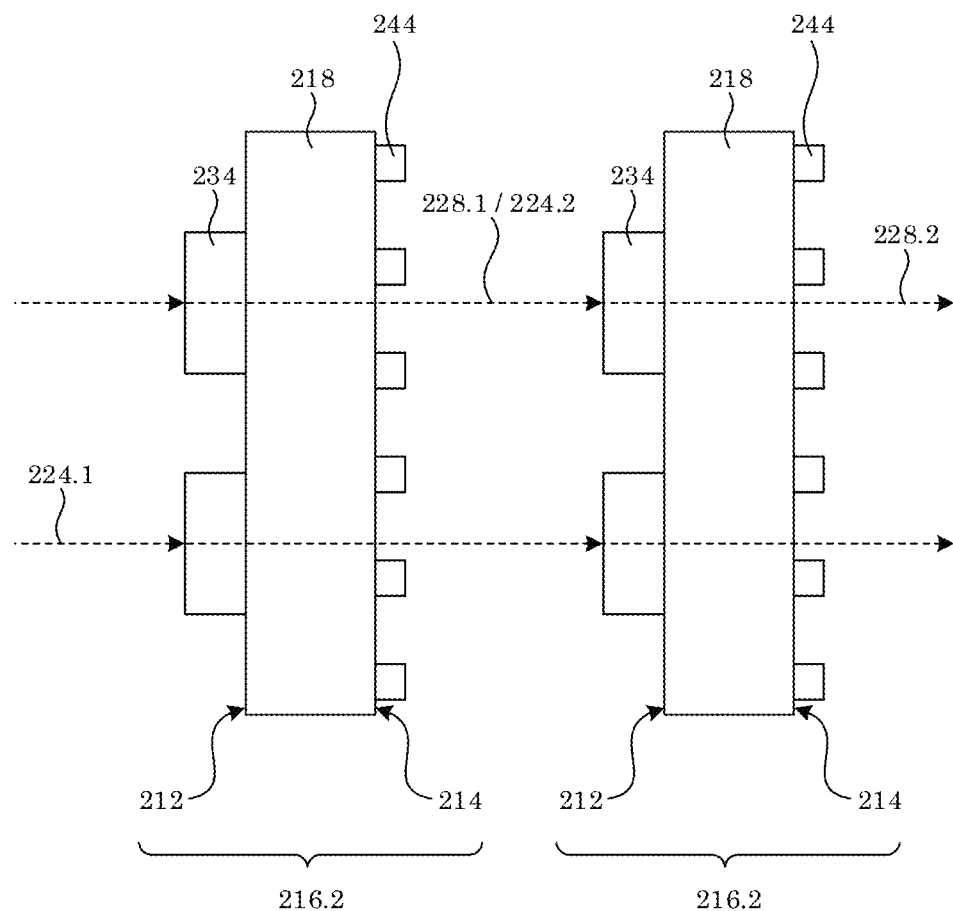
FIG. 4 shows a metasurface optical pulse shaper.

In an embodiment, with reference to FIG. 4, metasurface optical pulse shaper 200 includes secondary metasurface 216.2 in optical communication with metasurface 216.1, wherein secondary metasurface 216.2 includes a plurality of superpixels 234 disposed on substrate 218. Here, metasurface 216.1 receives primary frequency waves 224.1 and produces shaped frequency waves 228.1 that serve as primary frequency waves 224.2 that are received by metasurface 216.2. Metasurface 216.2 produces shaped frequency waves 228.2 from primary frequency waves 224.2, and shaped optical pulse 232 can be produced through spatial combination of shaped frequency waves 228.2.

Metasurface optical pulse shaper 200 shapes primary optical pulse 210 in a temporal domain and produces shaped frequency waves 228 that can be combined to form shaped optical pulse 232 that has a secondary shape that is different than the primary optical shape of primary optical pulse 210. As used herein, "shape" of an optical pulse refers to the envelope of an amplitude maxima of electric field oscillations of the pulse. Accordingly, "pulse shaping" and its variants such as "shaping" an optical pulse refers to changing a temporal profile of the optical pulse. A change in the temporal profile can include stretching, compressing, or producing a train of optical pulses. Here, primary optical pulse 210 is subjected to pulse shaping by metasurface optical pulse shaper 200, wherein metasurface optical pulse shaper 200 produces shaped optical pulse 232 from primary optical pulse 210. It should be appreciated that primary optical pulse 210 has a primary shape, and shaped optical pulse 232 has a secondary shape that differs from the primary shape due to stretching, compressing, or producing a train of pulses from the primary shape. Accordingly, the secondary shape of shaped optical pulse 232 can be stretched in the temporal domain as compared to the primary shape of primary optical pulse 210, compressed in the temporal domain as compared to the primary shape of primary optical pulse 210, or produced as a train of pulses from primary optical pulse 210.

Primary optical pulse 210 has a primary shape that can include a Gaussian shape that is transform limited, a Gaussian shape that is wider than transform limited, a shape that has multiple peaks, a shape that that is positively or negatively chirped, or a shape that is arbitrarily distorted. A temporal pulse width of primary optical pulse 210 can be from 1e-18 s (also written as $1 \times 10^{-8}$ s) to 1e-6 s, specifically from 1e-15 s to 1e-9 s, and more specifically from 5e-15 s to 1e-13 s. A frequency of primary optical pulse 210 can be from 1e18 Hz to 1e10 Hz, specifically from 1e17 Hz to 1e11 Hz, and more specifically from 5e14 Hz to 3e14 Hz. A wavelength of primary optical pulse 210 can be from 3e-10 m to 3e-1 m, specifically from 3e-9 m to 3e-3 m, and more specifically from 7e-9 m to 9e-9 m. An amplitude of primary optical pulse 210 can be from 1e-6 V/m to 1e9 V/m, from 1e-4 V/m to 1e6 V/m, and more specifically from 1e-3 V/m to 1 V/m. As used herein, "amplitude" refers to the peak amplitude of the electric field of the pulse. In an embodiment, primary optical pulse 210 includes a transform limited pulse, a pulse that is stretched compared to its transform limit, an asymmetric pulse, or a pulse with multiple peaks.

As shown in FIG. 5, primary disperser 222 can include grating 240 that receives primary optical pulse 210 and disperses primary optical pulse 210 into a plurality of primary frequency waves 224, wherein each primary frequency wave 224 has a frequency different than other primary frequency waves 224 and has a spatial position on mirror 242 that also is different. Shaped disperser 238 can include grating 240 that receives shaped frequency waves 228 in a focal plane of mirror 242 and combines shaped frequency waves 228 into shaped optical pulse 232. Grating 240 can include a periodic array of blazed or non-blazed grooves to diffract light according to its constituent frequency components. Exemplary gratings 240 include reflection-mode gratings, transmission mode gratings and holographic gratings. A length and width of grating 240 independently can be from 5e-4 m to 1 m, specifically from 5e-3 m to 5e-1 m, and more specifically from 1e-2 m to 5e-2 m. An optical reflectance of grating 240 can be from 10% to 99%, specifically from 20% to 90%, and more specifically from 60% to 70%. The groove density of grating 240 can be from 50 mm$^{-1}$ to 5000 mm$^{-1}$, specifically from 150 mm$^{-1}$ to 2100 mm$^{-1}$, and more specifically from 300 mm$^{-1}$ to 1200 mm$^{-1}$.

In primary disperser 222, mirror 242 reflects primary frequency wave 224 into a focal plane that maintains, by frequency, spatial separation of primary frequency waves 224. In shaped disperser 238, mirror 242 receives shaped frequency waves 228 from metasurface 216 and reflects shaped frequency waves 228 into a focal plane to combine shaped frequency waves 228 into shaped optical pulse 232. Mirror 242 can include a parabolic metallic surface able to reflect and collimate diverging incident light. Exemplary mirrors 242 include metallic mirrors, dielectric mirrors, flat mirrors and parabolic mirrors. An optical reflectance of mirror 242 can be from 5e-4 m to 1 m, specifically from 5e-3 m to 5e-1 m, and more specifically from 1e-2 m to 5e-2 m.

Primary disperser 222 receives primary optical pulse 210 and spatially disperses primary optical pulse 210 into primary frequency waves 224 according to frequency. A number of primary frequency waves 224 (e.g., 224.1, 224.2, . . . , 224.n, wherein n is an integer number of total primary frequency waves 224) can be selectively produced through dispersion, the number can be from 10 to 1e6, specifically from 10 to 1e4, and more specifically from 10 to 660. A temporal pulse width of primary frequency waves 224 can be from 1e-18 s to 1e-6 s, specifically from 1e-15 s to 1e-9 s, and more specifically from 5e-15 s to 1e-13 s. A frequency of primary frequency waves 224 independently can be from 1e18 Hz to 1e10 Hz, specifically from 1e17 Hz to 1e11 Hz, and more specifically from 5e14 Hz to 3e14 Hz. A wavelength of primary frequency waves 224 independently can be from 3e-10 m to 3e-1 m, specifically from 3e-9 m to 3e-3 m, and more specifically from 7e-9 m to 9e-9 m. An amplitude of primary frequency waves 224 independently can be from 1e-6 V/m to 1e9 V/m, from 1e-4 V/m to 1e6 V/m, and more specifically from 1e-3 V/m to 1 V/m. A polarization of primary frequency waves 224 can be linear, circular or elliptical. A relative phase of primary frequency waves 224 can be from 0 to 2pi radians.

Figure 6:
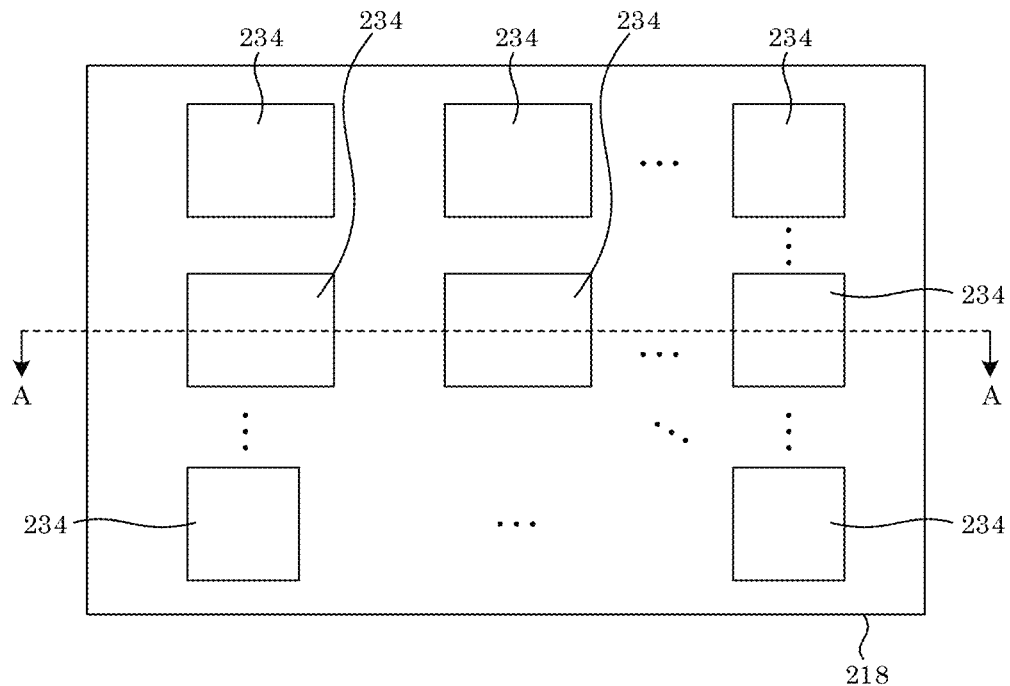
FIG. 6 shows a plurality of superpixels disposed on an entry surface of a metasurface of a metasurface optical pulse shaper in plan view in panel A, and panel B shows a cross-section along line A-A of the metasurface shown in panel A.
Figure 6:
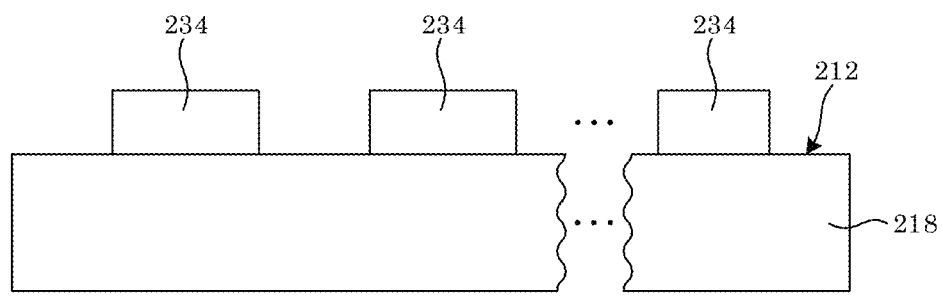

Primary frequency waves 224 are received by superpixels 234 disposed on metasurface 216. Superpixel 234 converts primary frequency wave 224 to phase wave 226 by interaction of elongated element 244 with nanopillars 248. Individual superpixel 234 receive individual primary frequency wave 224. Accordingly, superpixels 234 are spatially arranged on entry surface 212 in substrate 218, e.g., in an array as shown in FIG. 6. The mutual arrangement of superpixel 234 can be selected according to a frequency-dependent spatial distribution provided by primary disperser 222. Moreover, they can be contiguously arranged along a single line or form a two-dimensional array. A number of superpixels 234 (e.g., 234.1, 234.2, . . . , 234.n, wherein n is an integer number of total primary frequency waves 224) can be from 10 to 1e6, specifically from 10 to 1e4, and more specifically from 10 to 660. A length and width of superpixels 234 independently can be from 1e-7 m to 1e-1 m, specifically from 1e-6 m to 1e-3 m, and more specifically from 2e-5 m to 4e-5 m.

Figure 7:
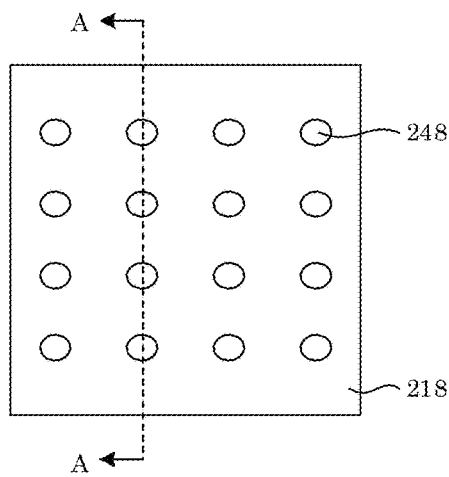
FIG. 7 shows a metasurface of a metasurface optical pulse shaper in plan view in panels A, B, and C, and panel D shows a cross-section along line A-A of the metasurface shown in panel A.
Figure 7:
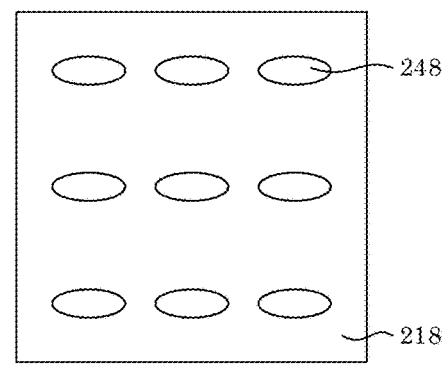
Figure 7:
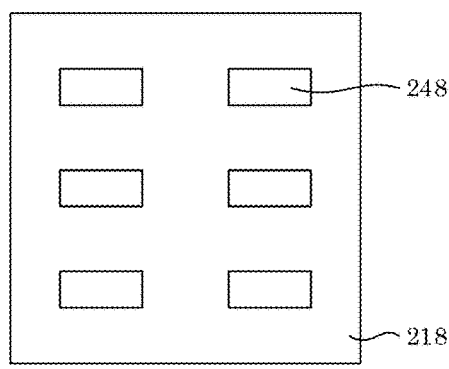
Figure 7:
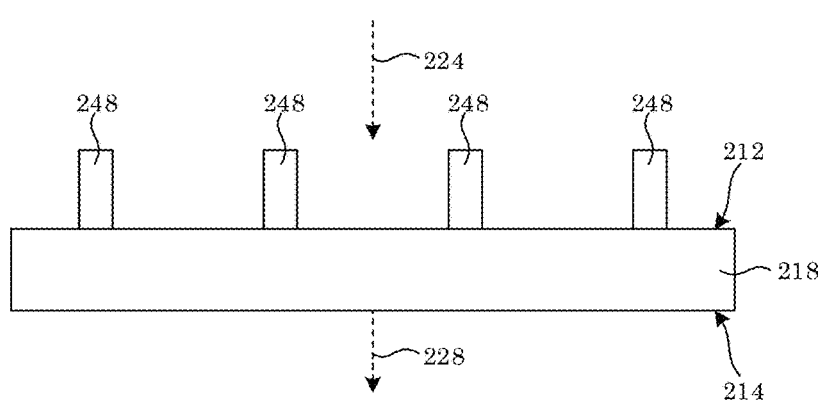
Figure 8:
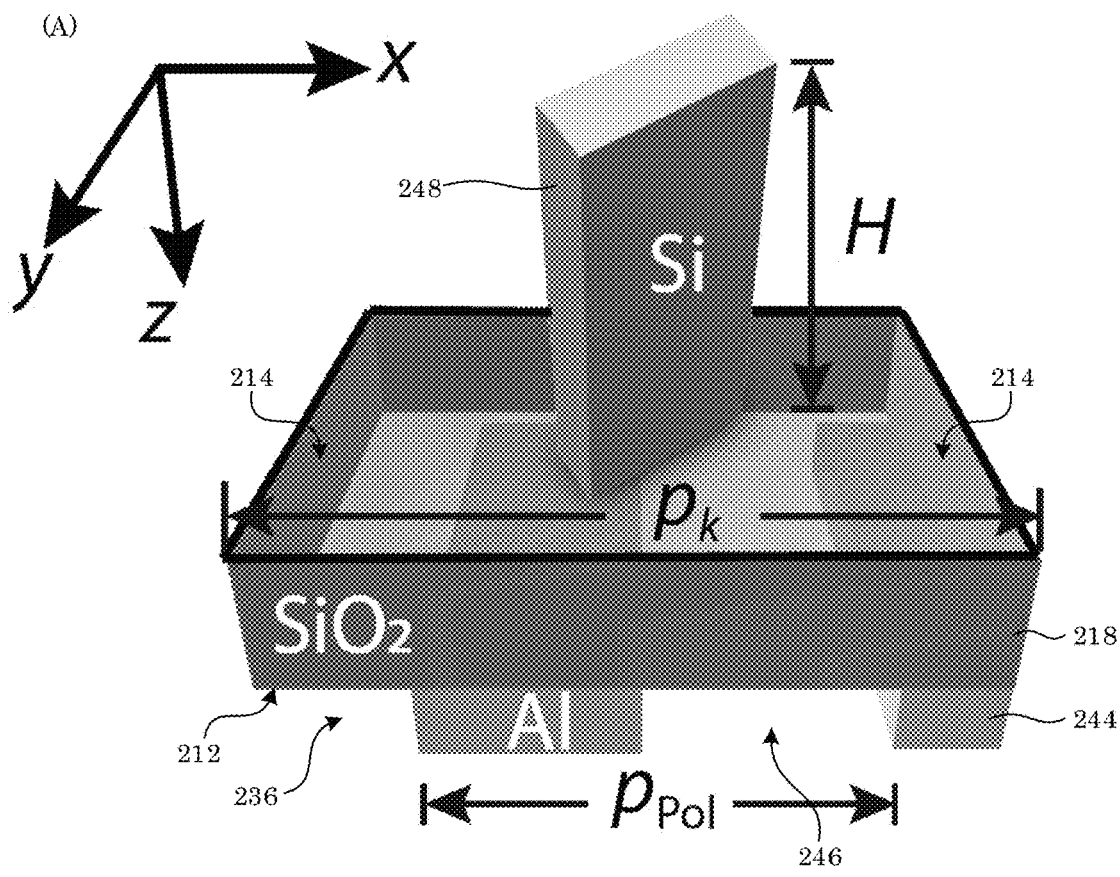
FIG. 8 shows, in panel A, a prospective view of a unit cell for a superpixel of a metasurface optical pulse shaper, wherein metasurface unit-cell of super-pixel $S_k$ (lattice constant $p_k$) includes (i) a rectangular Si nanopillar (of uniform height H=660 nm) acting as a half-wave plate, located on one side of fused-silica substrate, and (ii) an Al wire-grid linear polarizer (wire-pitch $p_{pol}$=200 nm, wire-thickness=150 nm and duty-cycle=50%) on the other side of the substrate—able to control simultaneously the phase and amplitude of the k-th spectral subrange, centered at $\lambda_k$, of a linearly polarized input pulse (electric-field oriented along the x-direction). Panel B shows a plan view of the unit cell in which the metasurface super-pixel unit-cell is indicated with in-plane dimensions $L_{x,k}$, $L_{y,k}$ and rotation angle $\theta_k$ of a Si nanopillar.
Figure 8:
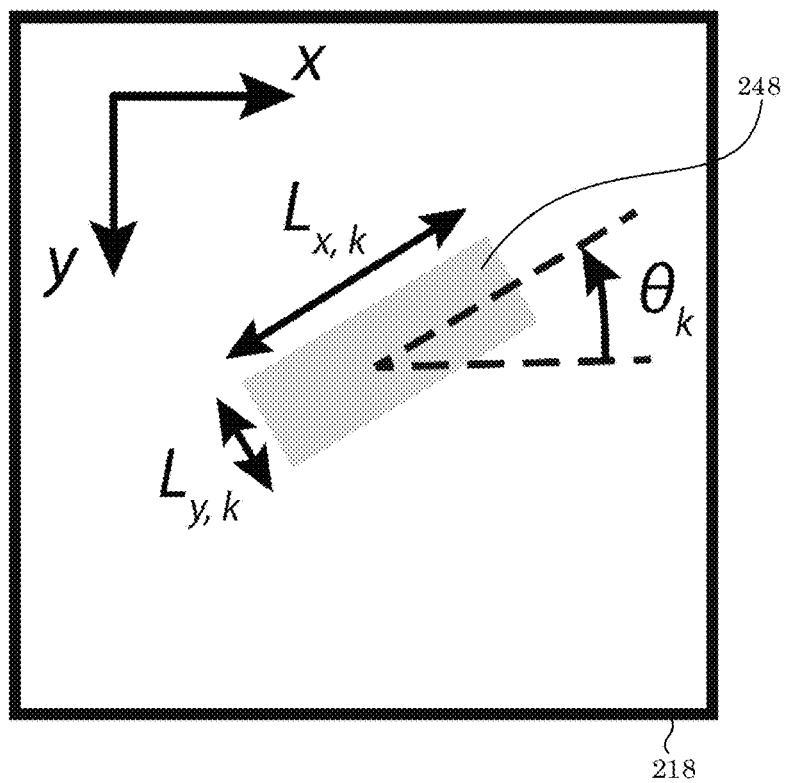

With reference to FIG. 7, FIG. 8, FIG. 9, and FIG. 10, superpixels 234 independently include a plurality of nanopillars 248 disposed on entry surface 212 and spaced apart at a subwavelength distance. Nanopillars 248 project from entry surface 212 opposite a direction of propagation of primary frequency waves 224. Nanopillars 248 are arranged in superpixels 234 on entry surface 212 of metasurface 216. Primary frequency wave 224 interacts with nanopillars 248 in superpixel 234 to produce phase wave 226. Nanopillars 248 can have a cross-sectional shape selected to provide phase wave 226 with a phase, referred to herein as a shaped phase, that is different than a phase of primary frequency wave 224, referred to herein as a primary phase. Accordingly, nanopillars 248 convert the primary phase to the shaped phase. With reference to FIG. 7, the cross-sectional shape, e.g., can be round as shown in panel A, ellipsoidal as shown in panel B, or polygonal (e.g., a regular polygon as rectangular, square, hexagonal, and the like; or an irregular polygon that has a plurality of sides of differing vertex angles or side lengths) as shown in panel C. With reference to FIG. 8, nanopillar 248 project from entry surface 212 with height H from exit surface 214 to a terminus of nanopillar 248, first length Lx, and second length Ly. Height H, first length Lx, and second length Ly independently can be from 3e-8 m to 5e-4 m, specifically from 5e-8 m to 1e-5 m, and more specifically from 1e-7 m to 1e-6 m. Moreover, nanopillar 248 can be oriented with respect to a length L1 of elongated element 244 of wire grid polarizer 236 at orientation angle θ that can be from 0 to pi radians. Further, in superpixel 234, nanopillar 248 in combination with a portion of elongated element 244 opposing nanopillar 248 is disposes as a unit cell (also referred to as a pixel) with pixel length pk that can be from 6e-8 m to 1e-3 m, specifically from 1e-7 m to 2e-5 m, and more specifically from 2e-7 m to 2e-6 m. A number of unit cells per superpixel 234 independently can be from 1 to 1e6, specifically 10 to 1e5, and more specifically from 2e4 to 4e4. Orientation angles θ among superpixels 234 can be the same or different and can be selected to provide different shaped phases to phase waves 226.

Substrate 218 has entry surface 212 and exit surface 214 on which superpixel 234 and wire grid polarizer 236 respectively are disposed. Substrate 218 can include a flat transparent dielectric slab able to provide mechanical support for nanopillars 248 and elongated element 244. Substrate 218 can have index of refraction that is lower than that of nanopillars 248. Substrate 218 can be made of fused silica, sapphire, or quartz. Exemplary substrates 218 include double-side polished fused silica wafers. A length and width of substrate 218 can independently be from 6e-7 m to 1 m, specifically from 1e-6 m to 5e-1 m, and more specifically from 5e-4 m to 5e-2 m. A thickness of substrate 218 can be from 1e-6 m to 1e-1 m, specifically from 1e-5 m to 1e-2 m, and more specifically from 1e-4 m to 1e-3 m A length and width of substrate 218 can independently be from 6e-7 m to 1 m, specifically from 1e-6 m to 5e-1 m, and more specifically from 5e-4 m to 5e-2 m. A thickness of substrate 218 can be from 1e-6 m to 1e-1 m, specifically from 1e-5 m to 1e-2 m, and more specifically from 1e-4 m to 1e-3 m.

Figure 11:
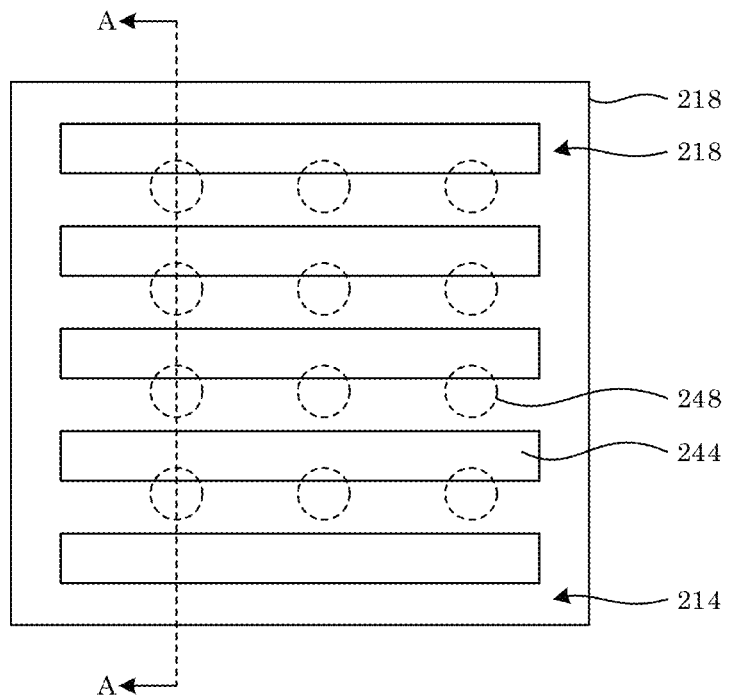
FIG. 11 shows a wire grid polarizer disposed on an exit surface of a metasurface of a metasurface optical pulse shaper in plan view in panels A, and panel B shows a cross-section along line A-A of the metasurface shown in panel A.
Figure 11:
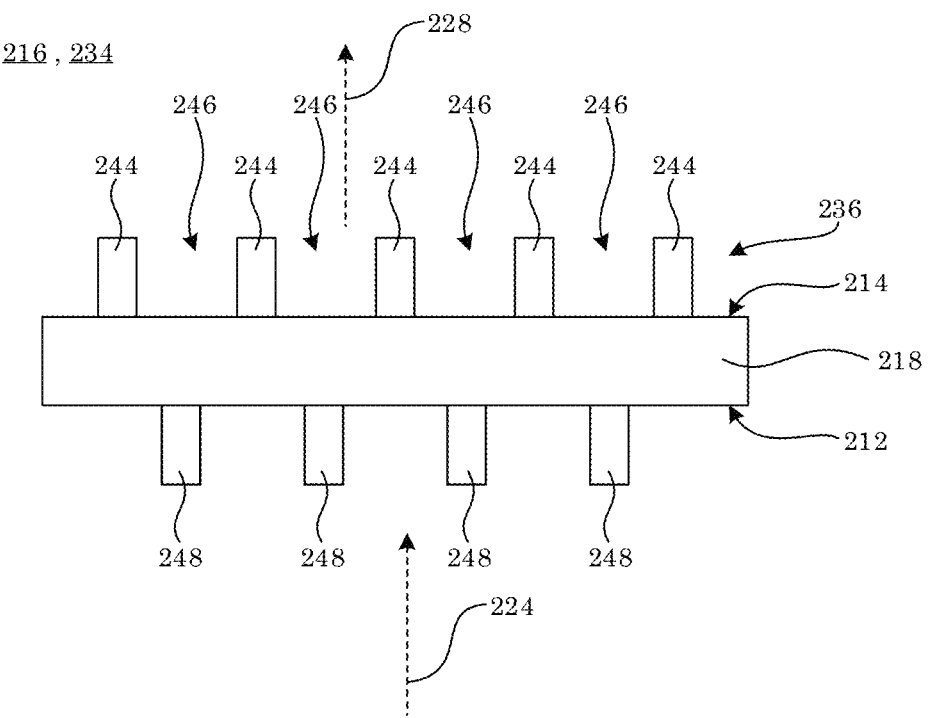

With reference to FIG. 11, wire grid polarizer 236 is disposed on exit surface 214 of substrate 218 and can include elongated element 244 that are spaced apart and bound exit slit 246 interposed between neighboring elongated element 244. Wire grid polarizer 236 acts as a linear polarizer by allowing transmission of light of polarization perpendicular to the direction of spacing of element 244, and blocking light of polarization parallel to the direction of elongation of element 244. Exemplary elongated elements 244 include aluminum wires and gold wires. Length L2 can be from 6e-7 m to 1 m, specifically from 1e-6 m to 5e-1 m, and more specifically from 5e-4 m to 5e-2 m. Length L1, and separation distance D of elongated elements 244 independently can be from 6e-8 m to 1e-3 m, specifically from 1e-7 m to 2e-5 m, and more specifically from 2e-7 m to 2e-6 m.

Phase wave 226 is produced by metasurface 216. A number of phase wave 226 (e.g., 226.1, 226.2, ..., 226.$n$, wherein n is an integer number of total phase waves 226) can be from 10 to 1e6, specifically from 10 to 1e4, and more specifically from 10 to 660. A temporal pulse width of phase wave 226 independently can be from 1e-18 s to 1e-6 s, specifically from 1e-15 s to 1e-9 s, and more specifically from 5e-15 s to 1e-13 s. A frequency of phase wave 226 independently can be from 1e18 Hz to 1e10 Hz, specifically from 1e17 Hz to 1e11 Hz, and more specifically from 5e14 Hz to 3e14 Hz. A wavelength of phase wave 226 independently can be from 3e-10 m to 3e-1 m, specifically from 3e-9 m to 3e-3 m, and more specifically from 7e-9 m to 9e-9 m. An amplitude of phase wave 226 independently can be from 1e-6 V/m to 1e9 V/m, from 1e-4 V/m to 1e6 V/m, and more specifically from 1e-3 V/m to 1 V/m. A polarization of phase wave 226 can be linear, circular or elliptical range from 0 to 2pi radians.

Shaped frequency wave 228 is produced from phase wave 226 by metasurface 216. A number of shaped frequency wave 228 (e.g., 228.1, 228.2, ..., 228.$n$, wherein n is an integer number of total shaped frequency waves 228) can be from 10 to 1e6, specifically from 10 to 1e4, and more specifically from 10 to 660. A temporal pulse width of shaped frequency waves 228 independently can be from 1e-18 s to 1e-6 s, specifically from 1e-15 s to 1e-9 s, and more specifically from 5e-15 s to 1e-13 s. A frequency of shaped frequency waves 228 independently can be from 1e18 Hz to 1e10 Hz, specifically from 1e17 Hz to 1e11 Hz, and more specifically from 5e14 Hz to 3e14 Hz. A wavelength of shaped frequency waves 228 independently can be from 3e-10 m to 3e-1 m, specifically from 3e-9 m to 3e-3 m, and more specifically from 7e-9 m to 9e-9 m. An amplitude of shaped frequency waves 228 independently can be from 1e-6 V/m to 1e9 V/m, from 1e-4 V/m to 1e6 V/m, and more specifically from 1e-3 V/m to 1 V/m. It should be appreciated that wire grid polarizer 236 selectively changes an amplitude of phase wave 226 so that the amplitude of shaped frequency wave 228 can be different than the amplitude of phase wave 226 from which shaped frequency wave 228 was produced.

Shaped optical pulse 232 is produced by combining shaped frequency waves 228. Shaped optical pulse 232 has a secondary shape that can include a Gaussian shape that is transform limited, a Gaussian shape that is wider than transform limited, a shape that has multiple peaks, a shape that that is positively or negatively chirped, or a shape that is arbitrarily distorted. A temporal pulse width of shaped optical pulse 232 can be from 1e-18 s to 1e-6 s, specifically from 1e-15 s to 1e-9 s, and more specifically from 5e-15 s to 1e-13 s. A frequency of shaped optical pulse 232 can be from 1e18 Hz to 1e10 Hz, specifically from 1e17 Hz to 1e11 Hz, and more specifically from 5e14 Hz to 3e14 Hz. A wavelength of shaped optical pulse 232 can be from 3e-10 m to 3e-1 m, specifically from 3e-9 m to 3e-3 m, and more specifically from 7e-9 m to 9e-9 m. An amplitude of shaped optical pulse 232 can be from 1e-6 V/m to 1e9 V/m, from 1e-4 V/m to 1e6 V/m, and more specifically from 1e-3 V/m to 1 V/m. In an embodiment, shaped optical pulse 232 includes a transform limited pulse, a pulse that is stretched compared to its transform limit, an asymmetric pulse, or a pulse with multiple peaks.

Metasurface optical pulse shaper 200 can be made in various ways. In an embodiment, a process for making metasurface optical pulse shaper 200 includes forming nanopillars 248 and superpixel 234 on substrate 218 by depositing nanopillar 248 material on substrate 218, and patterning the material using electron beam lithography and dry etching and forming wire grid polarizer 236 by depositing elongated element 244 material on substrate 218, and patterning the material using electron beam lithography and dry etching. Primary disperser 222 can be disposed in optical communication with superpixel 234 by mechanical alignment using a three-axis mechanical stage. Shaped disperser 238 can be disposed in optical communication with metasurface 216 by mechanical alignment using a three-axis mechanical stage.

Metasurface optical pulse shaper 200 has numerous advantageous and unexpected benefits and uses. In an embodiment, a process for optically changing a pulse shape with metasurface optical pulse shaper 200 includes: dispersing primary optical pulse 210 into a plurality of primary frequency waves 224 that includes a primary frequency and a primary phase; separating spatially, by frequency, primary frequency waves 224; receiving, by superpixels 234, primary frequency waves 224, individual superpixels 234 receiving an individual primary frequency wave 224; changing, by superpixels 234, a relative phase of primary frequency waves 224 to produce shaped phases; and producing, by superpixels 234 from primary frequency waves 224, a plurality of phase waves 226 that are separated spatially by frequency and phase, individual phase waves 226 including: the primary frequency of primary frequency wave 224 from which phase wave 226 was produced; and a shaped phase, wherein at least one of the plurality of shaped phases is different among the shaped phases; and producing, by substrate 218, a plurality of shaped frequency waves 228 such that, from an individual phase wave 226, a shaped frequency wave is produced and includes: the primary frequency, the shaped phase, and a shaped polarization, phase waves 226 and shaped frequency waves 228 being separated spatially by frequency and phase, such that a superposition of shaped frequency waves 228 produce a shaped optical pulse 232 that includes a secondary pulse shape, primary optical pulse 210 including a primary shape that is different than the secondary pulse shape.

In the process for optically changing a pulse shape, dispersing primary optical pulse 210 into a plurality of primary frequency waves 224 includes aligning the center of grating 240 to the center of the incident pulse 210. In the process for optically changing a pulse shape, reflecting and collimating primary frequency waves 224 with spatial separation matching length Lx of superpixel 234 includes adjusting location and angle of mirror 242 with respect to grating 240. In the process for optically changing a pulse shape, receiving, by superpixels 234, primary frequency waves 224 includes positioning metasurface 216.

The process for optically changing a pulse shape also can include receiving, by primary disperser 222 in optical communication with superpixels 234, primary optical pulse 210 by aligning primary disperser 222 to optical pulse 210. The process for optically changing a pulse shape also can include receiving, by shaped disperser 238, shaped frequency waves 228 from metasurface 216 by aligning shaped disperser 318 to shaped frequency waves 228. The process for optically changing a pulse shape also can include receiving, by mirror 242, shaped frequency waves 228 from phase wave 226 by adjusting location and angle of mirror 242 with respect to shaped frequency waves 228. The process for optically changing a pulse shape also can include spatially focusing shaped frequency waves 228 into a focal plane by adjusting location and angle of mirror 242 with respect to shaped frequency waves 228. The process for optically changing a pulse shape also can include receiving, by grating 240, shaped frequency waves 228 in the focal plane of mirror 242 by adjusting the location and angle of grating 240.

Metasurface optical pulse shaper 200 and processes disclosed herein have numerous beneficial uses including arbitrary optical pulse shaping with high spectral resolution, broad range of frequencies of operation, and high damage threshold. Advantageously, metasurface optical pulse shaper 200 overcomes limitations of technical deficiencies of conventional articles such as spatial light modulators or deformable mirrors, which suffer from lower spectral resolution, operation restricted to a more limited selection of frequency ranges, and lower damage threshold. Higher spectral resolution enables Metasurface optical pulse shaper 200 to control individual frequency lines of a frequency comb source. Further, compared to conventional articles, metasurface optical pulse shaper 200 provides a more compact approach to pulse shaping due to its ability to control both phase at amplitude at the single superpixel level.

Moreover, metasurface optical pulse shaper 200 and processes herein have numerous advantageous properties. In an aspect, metasurface optical pulse shaper 200 offer the possibility of shaping the spatial wavefront of an optical pulse in addition to temporal optical pulse shaping. Metasurface optical pulse shaper 200 and processes herein unexpectedly allow simultaneous control at the single superpixel level of both phase at amplitude of the individual frequency components of an optical pulse allowing arbitrary control of the shape of the pulse in an utmost compact form.

The articles and processes herein are illustrated further by the following Examples, which are non-limiting.

EXAMPLES

Example 1. Ultrafast Optical Pulse Shaping Using Dielectric Metasurfaces

Metasurfaces arbitrarily shape an ultrafast optical pulse by manipulating its spectral amplitude and phase. In this regard, advances in ultrafast lasers, chirped pulse amplifiers, and frequency comb technology involve pulse-modulation strategies that support large bandwidth and high peak power while maintaining high spectral resolution. This Example describes dielectric metasurfaces that shape a temporal profile of a near-infrared femtosecond pulse as a high resolution, high efficiency, and integration-friendly apparatus that overcomes technical limitations of spatial light modulators. Finely tailored pulse shaping operations, including splitting, compression, chirping and higher-order distortion, are achieved using a metasurface optical pulse shaper that includes a Fourier-transform arrangement in which a metasurface manipulates, simultaneously or independently, amplitude and phase of the constituent frequency components of the pulse.

Development of ultrafast lasers that produce a train of optical pulses in the time-domain, or equivalently a comb of closely spaced spectral lines in the frequency-domain, have led to revolutionary advances in areas such as high-field physics, quantum optics and frequency metrology. These advances are enabled by the development of pulse-shaping techniques that began with dispersion compensation and achieved customizable shaping of pulses through manipulation in either the time or the frequency domain. Because of the broadband nature of ultrafast pulses, the most common embodiment of pulse shaping involves some form of dispersion engineering, such as pulse compression for coherent communication or nonlinear microscopy, and pulse stretching for chirped pulse amplification. Furthermore, optical arbitrary waveform generation through arbitrary control over the amplitude and phase of individual frequency comb lines enables a broad range of applications such as coherent manipulation of quantum mechanical processes, frequency-comb spectroscopy, and ultrafast communications. Among the various pulse shaping techniques, Fourier-transform pulse shaping, which synthesizes optical pulses through parallel manipulation of spatially separated spectral components, has been the most widely adopted. This form of pulse shaping typically employs a liquid-crystal based spatial light modulator (SLM), which offers dynamic control over the optical amplitude and phase. However, SLMs are often bulky, costly, and limited in spectral resolution due to finite pixel size and pixel density.

Dielectric metasurfaces, which ultrathin, planar optical elements composed of an array of dielectric nanostructures, provide a compact alternative to SLMs for arbitrary control over the amplitude, phase, and polarization of light for spatial-domain wavefront manipulation. Here, we implement and demonstrate metasurface-enabled pulse shapers able to tailor, instead, the temporal profile of an ultrafast optical pulse. A pulse shaper consists of a Fourier-transform (spectral dispersing-recombining) setup (also referred to a metasurface optical pulse shaper) embedding a dielectric metasurface in its focal plane. The metasurface is formed of arrays of dielectric nanopillars of spatially-varying in-plane dimensions and orientation tailored to impart, simultaneously and independently, a designed phase shift and transmittance specific to the frequency of the dispersed beam incident at that location. To first validate this metasurface-enabled approach and its ability to achieve arbitrary tailoring of the temporal profile of an ultrafast pulse, splitting of a femtosecond pulse into two replicas with controlled time-domain separation is demonstrated. To further highlight the versatility of the technique, compression of a chirped pulse to its transform limit is achieved by leveraging a metasurface encoding the corresponding negative chirp. Finally, cascading two metasurfaces within the focal volume of the pulse shaper enables reconfigurable synthesis of a finely tailored, third-order polynomial spectral phase function, yielding a time-domain pulse waveform combining negative chirp and higher-order distortion.

Figure 14:
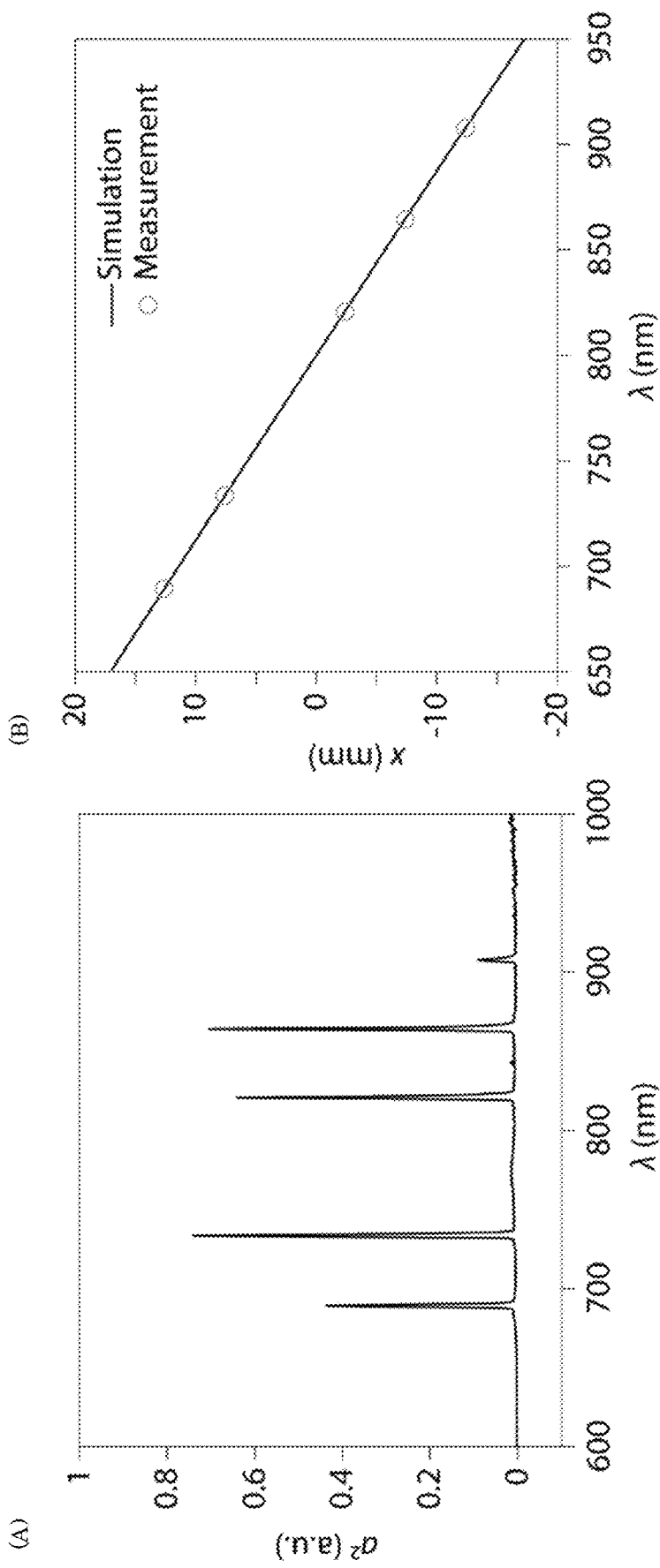
FIG. 14 shows quasi-linear mapping of $\lambda(x)$. (A) Representative spectrum of the pulse transmitted through a reference modulation mask consisting of two sets of apertures, one with two and another with three apertures, respectively. The apertures in each group are aligned along the x-direction in an asymmetric manner for the ease of wavelength to space calibration. The aperture pitch within each group is 5 mm. The reference modulation mask was translated along the x-axis at multiple locations to confirm the mapping of $\lambda(x)$. (B) The calibrated relation between x-position and wavelength $\lambda$ at the Fourier plane. The red circles correspond to the peaks in A and the blue line corresponds to the simulated $\lambda(x)$ of the optical system using ray tracing. $\lambda(x)$ can be fitted with a linear function: $\lambda(x)$=-8.78 nm/mm·x+800 nm.
Figure 15:
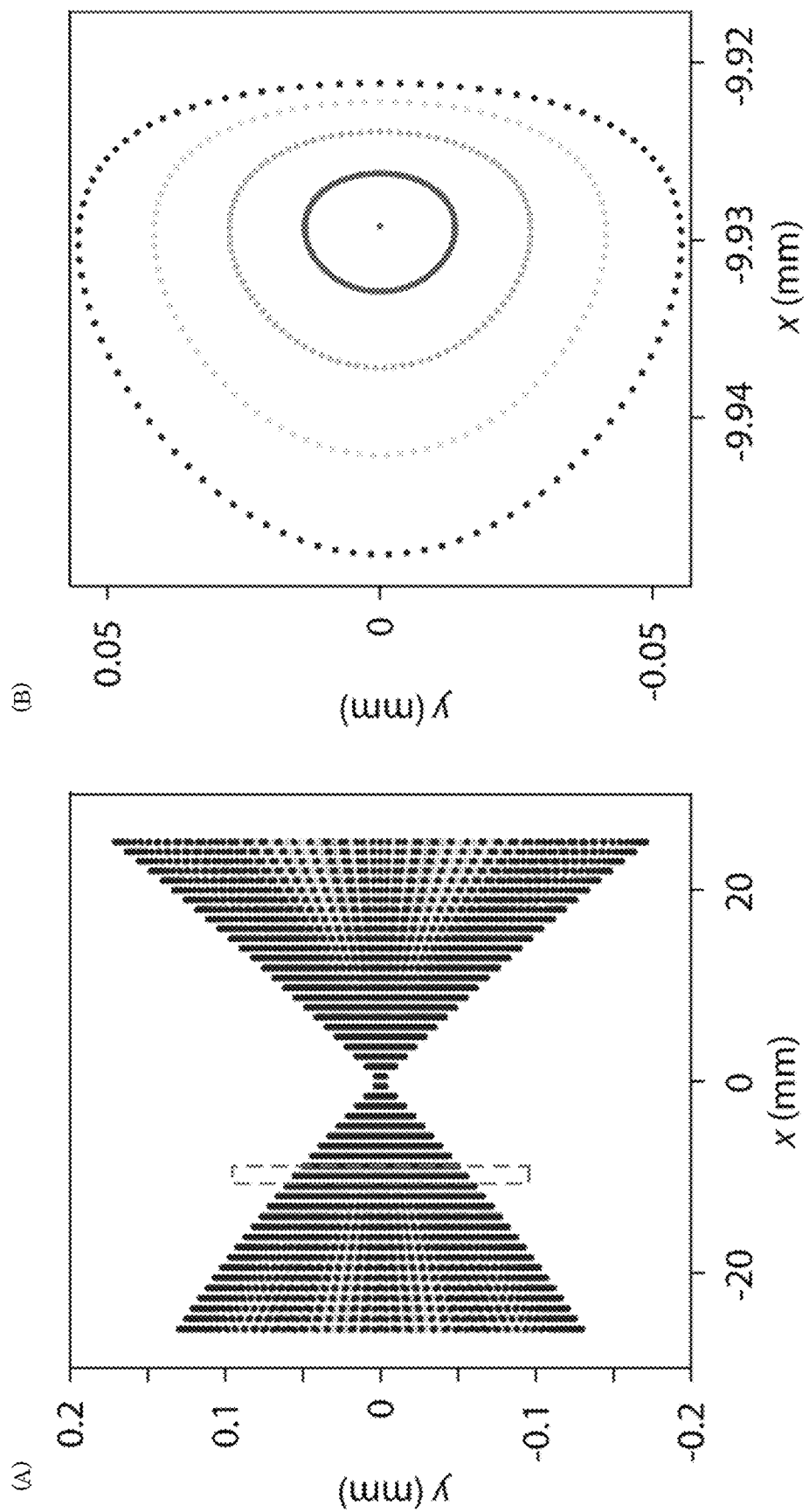
FIG. 15 shows ray tracing spot diagrams of the optical setup. The frequency component at 800 nm is assumed to strike the mirror along the optical axis. (A) A spot diagram showing astigmatism-limited spots near focus for light of wavelengths between 580 nm (right-most spots, at x=25 mm) and 1024 nm (left-most spots, at x=-25 mm). These individual spot diagrams, for various wavelengths, appear as vertical lines because of the greatly different scaling of the x and y axes. (B) A representative zoomed-in spot diagram for an incident beam of radius 1 cm at a wavelength of 888 nm (a zoomed version of the red box in A at x≈-9.93 mm). The red, green, light blue, and dark blue spots represent rays at a position of 0.25, 0.5, 0.75, and 1.0 times the radius of the incident beam, respectively.
Figure 16:
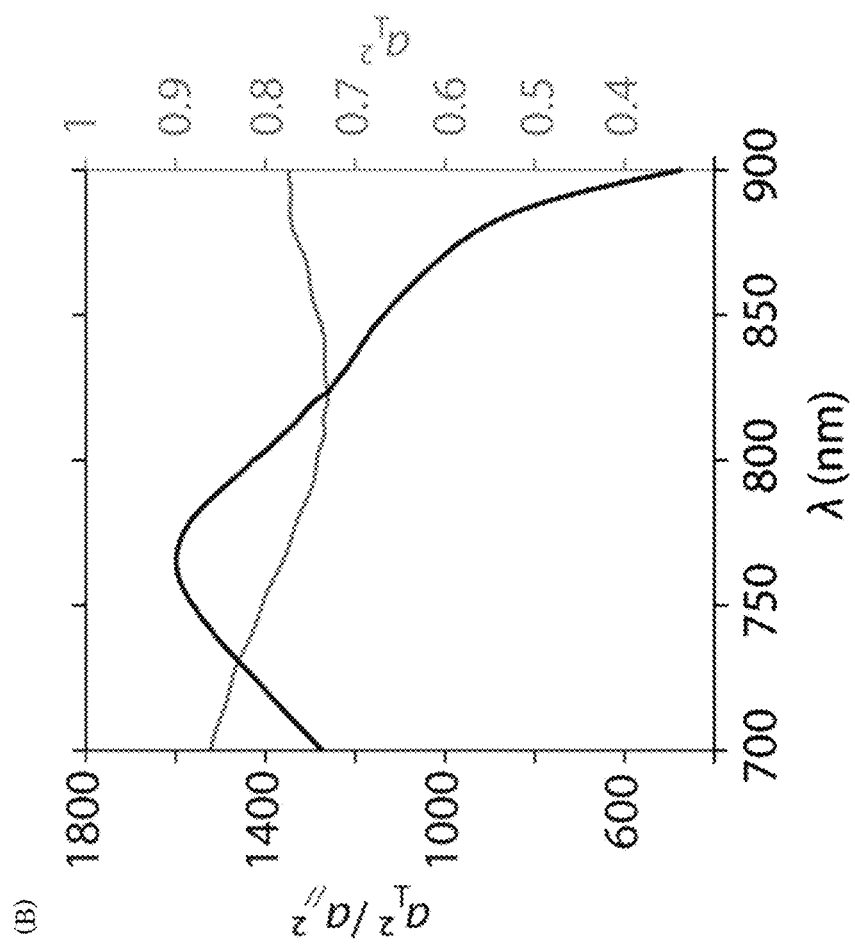
FIG. 16 shows experimental characterization of the thin-film wire-grid polarizer patterned at the back of the fused silica substrate. (A) A representative SEM image (52° perspective view) of the wire polarizer fabricated for this study. The polarizer wires consist of 100 nm-wide and 500 µm-long Al nanowires, positioned in a one-dimensional lattice with pitch of 200 nm along the x-direction. Scale bar represents 1 µm. (B) Experimentally measured extinction ratio ($a_\perp^2/a_\parallel^2$) and relative power transmittance $a_\perp^2$ vs. wavelength $\lambda$ of the wire polarizer, where $a_\perp^2$ is the power transmittance for the input-polarization orthogonal to the wires and $a_\parallel^2$ is that for the polarization parallel to the wires.
Figure 16:
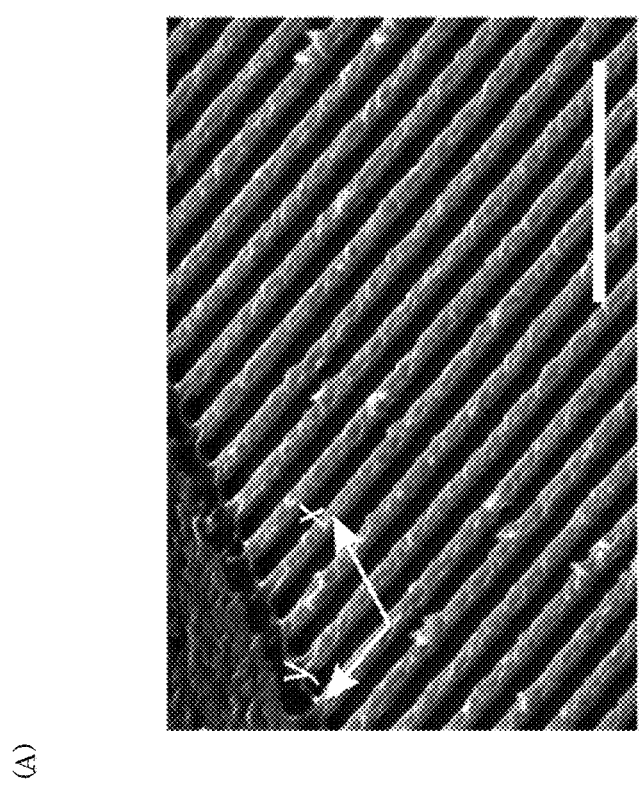

The Fourier-transform pulse shaper demonstrated here transforms a time-domain waveform $f(t)$ into a targeted waveform $g(t)$ by transmission through a tailored metasurface that physically implements a complex masking function $Y(\omega)$ relating the respective complex spectra $F(\omega)$ and $G(\omega)$ of the input and output waveforms according to $G(\omega)=Y(\omega)F(\omega)$. The metasurface is designed to operate on near-infrared ultrafast pulses having spectral components contained within an ultrawide wavelength range spanning from $\lambda_{min}=700$ nm to $\lambda_{max}=900$ nm. The various pulse shaping functions are demonstrated using as inputs either a transform-limited pulse of 10 fs duration generated by a Ti:Sapphire oscillator (full-width at tenth-maximum bandwidth 80 THz centered at 800 nm) or its temporally stretched form induced by passage through a 5-mm-thick glass slab. In the Fourier transform setup (FIG. 12A), the input optical pulse is first spectrally dispersed by a grating. Each angularly separated frequency component of the pulse is then focused by an off-axis metallic parabolic mirror onto a specific lateral position (along the x-direction) in the focal plane of the mirror, yielding an elongated focal spot along the x-direction, of length≈2.2 cm, where the wavelength varies from $\lambda_{min}$ to $\lambda_{max}$ according to a quasi-linear function $\lambda(x)$ (see FIG. 14). Along the orthogonal y-direction in the focal plane, the beam remains undispersed and confined to an astigmatism-limited, maximum width of ≈200 µm (FIG. 15). A metasurface implementing the targeted masking function $Y(\omega)$, of rectangular dimensions $w_x$=2.2 cm and $w_y$=300 m, is positioned in the focal plane centered on the beam. After passing through the metasurface and undergoing local phase shift and amplitude transformation, the spectral components of the beam are recombined using a second parabolic mirror and grating, yielding an output pulse of modified temporal shape as characterized by direct electric-field reconstruction using spectral phase interferometry.

Figure 17:
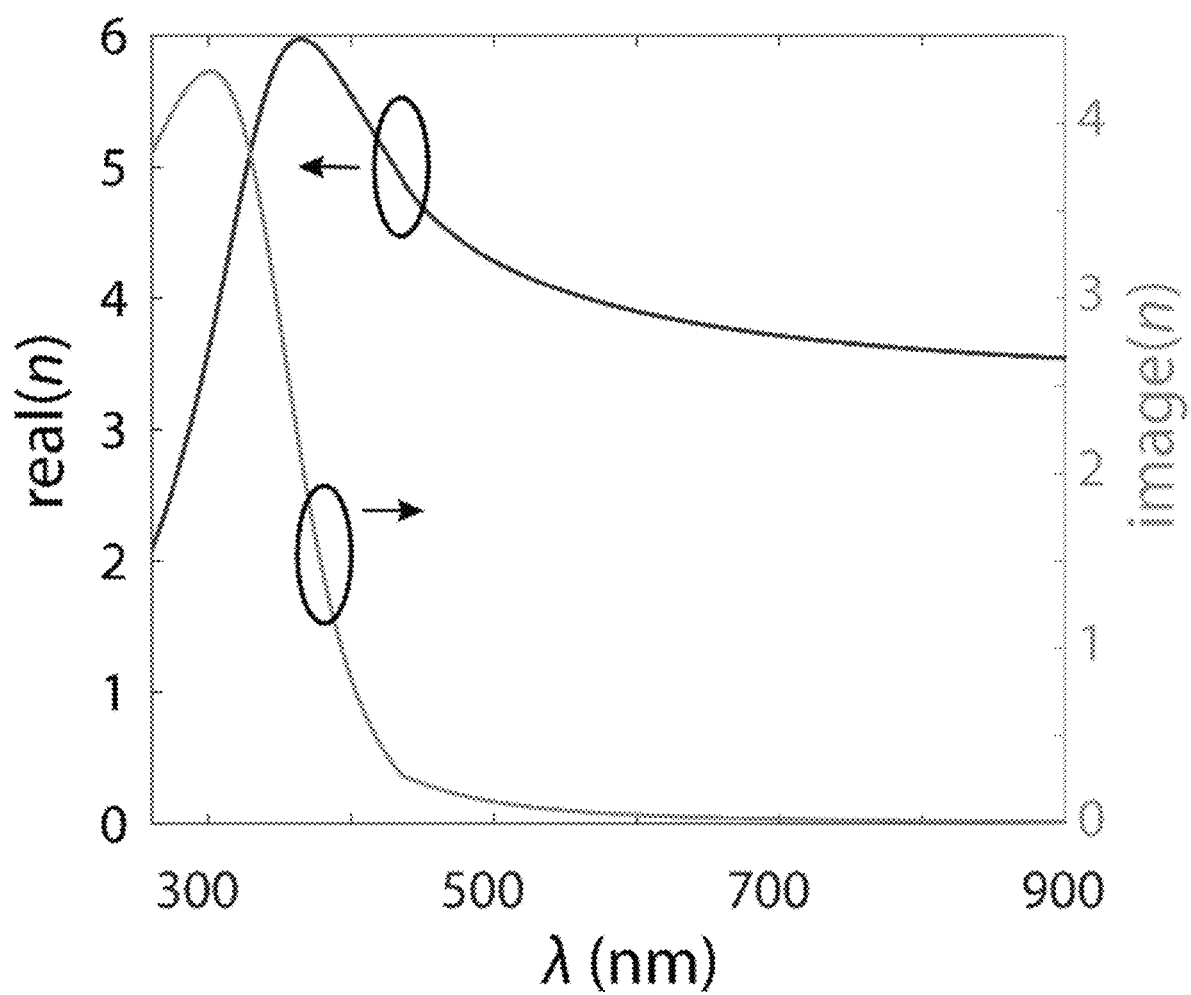
FIG. 17 shows a refractive index of polycrystalline silicon. The real and imaginary part of the refractive index (n) of LPCVD Si, deposited on an oxide coated reference Si substrate (thermal oxide thickness=300 nm), and measured using spectroscopic ellipsometry.

Arbitrary tailoring of the temporal profile of an ultrafast pulse requires control of both the spectral phase and amplitude of the pulse. A metasurface-enabled pulse shaper can achieve this by use of a constituent metasurface that imparts spatially-varying phase $\varphi(x)$ and transmission amplitude $a(x)$ to the lateral positions of the focal spot corresponding to different wavelengths, yielding a masking function:

$$Y(\omega(x))=a(x)e^{i\varphi(x)}, \qquad (1)$$

where $\omega(x)=2\pi c/\lambda(x)$ and c is the speed of light in free-space. To implement the targeted masking function $Y(\omega(x))$, the metasurface is divided into N super-pixels contiguously arranged over a 2.2-cm-long distance along the x-direction, where each super-pixel $S_k$ (indexed k=1, 2, ... N and centered at position $x_k$) is designed to impart phase shift $\varphi_k=\varphi(x_k)$ and transmission amplitude $a_k=a(x_k)$ to the k-th wavelength subrange, centered at $\lambda_k=(x_k)$, of the N consecutive subranges including the full spectrum of the pulse. The choice of N=660 super-pixels (each of length 34 µm) defines N independently controllable spectral subranges of respective bandwidth 0.3 nm, ensuring operation at the upper limit of the spectral resolution (z 140 GHz) given by the specific design of the Fourier-transform setup. Each super-pixel includes a square lattice (lattice constant $\beta_k$) of identical silicon nanopillars of rectangular cross-section and equal height H=660 nm (FIG. 7A), which act as phase-delay and polarization-manipulating waveguides. The phase shift $\varphi_k$ and transmission amplitude factor $a_k$ imparted by super-pixel k are set respectively by the in-plane dimensions ($L_{x,k}$ and $L_{y,k}$) and in-plane rotation angle $\theta_k$ of the dielectric nanopillars (FIG. 7B). The nanopillars are located on one side of a fused-silica substrate custom-patterned with an aluminum wire-grid linear polarizer on the other side (FIG. 15). The nanopillars and the polarizer are fabricated by patterning polycrystalline silicon and aluminum respectively, which are deposited on either side of the substrate, using electron-beam lithography followed by reactive ion etching. Polycrystalline silicon was selected for its large refractive index and low optical absorption across the entire near-infrared spectral range (FIG. 17); aluminum was selected for its environmental stability, ease of fabrication and low absorption loss; and fused-silica was selected for its low refractive index, low optical dispersion, and optical isotropy.

We first demonstrate a versatile approach to generate an arbitrary masking function Y of the form described in Eq. (1), in other words representing simultaneous manipulation of both phase and amplitude of each spectral component. We implement such a function using a scheme in which the phase shift $\varphi_k$ and transmission amplitude $a_k$ at each super-pixel can be generated independently over the full range of possible values $\varphi_k \in [-\pi, \pi]$ and $a_k \in [0, 1]$. This is achieved, under the simple constraint of a linearly polarized input pulse (electric-field oriented along the x-direction), by tailoring each nanopillar to act as a half-wave plate (HWP) which, in combination with the wire-grid polarizer, allows $\varphi_k$ to be controlled only by $L_{x,k}$ and $L_{y,k}$, and $a_k$ to be controlled only by $\theta_k$. To show this, we note that the polarization state of any local spectral component exiting the polarizer after passage through a metasurface pillar, having arbitrary rectangular profile and rotated by angle $\theta$, can be expressed by the Jones vector (see supplementary text):

$$J = \begin{bmatrix} e^{i\varphi_x}\cos^2\theta + e^{i\varphi_y}\sin^2\theta \\ 0 \end{bmatrix}, \qquad (2)$$

where $\varphi_x$ and $\varphi_y$ are the phase-shifts for $\theta$=0° and 90°, respectively, and x-polarized incidence is assumed. Introducing the half-wave plate condition $\varphi_x-\varphi_y=\pm\pi$ in Eq. (2)—through appropriate choice of $L_x$ and $L_y$—leads to an output-wave Jones vector given by:

$$J = \begin{bmatrix} e^{i\varphi_x}\cos(2\theta) \\ 0 \end{bmatrix}. \qquad (3)$$

This vector describes an x-polarized output wave of phase shift and amplitude determined by independent variables, $\varphi_x$ and $\theta$, respectively, for which the exit phase shift $\varphi_x$ stays constant as the half-wave plate is rotated by $\theta$.

Figure 12:
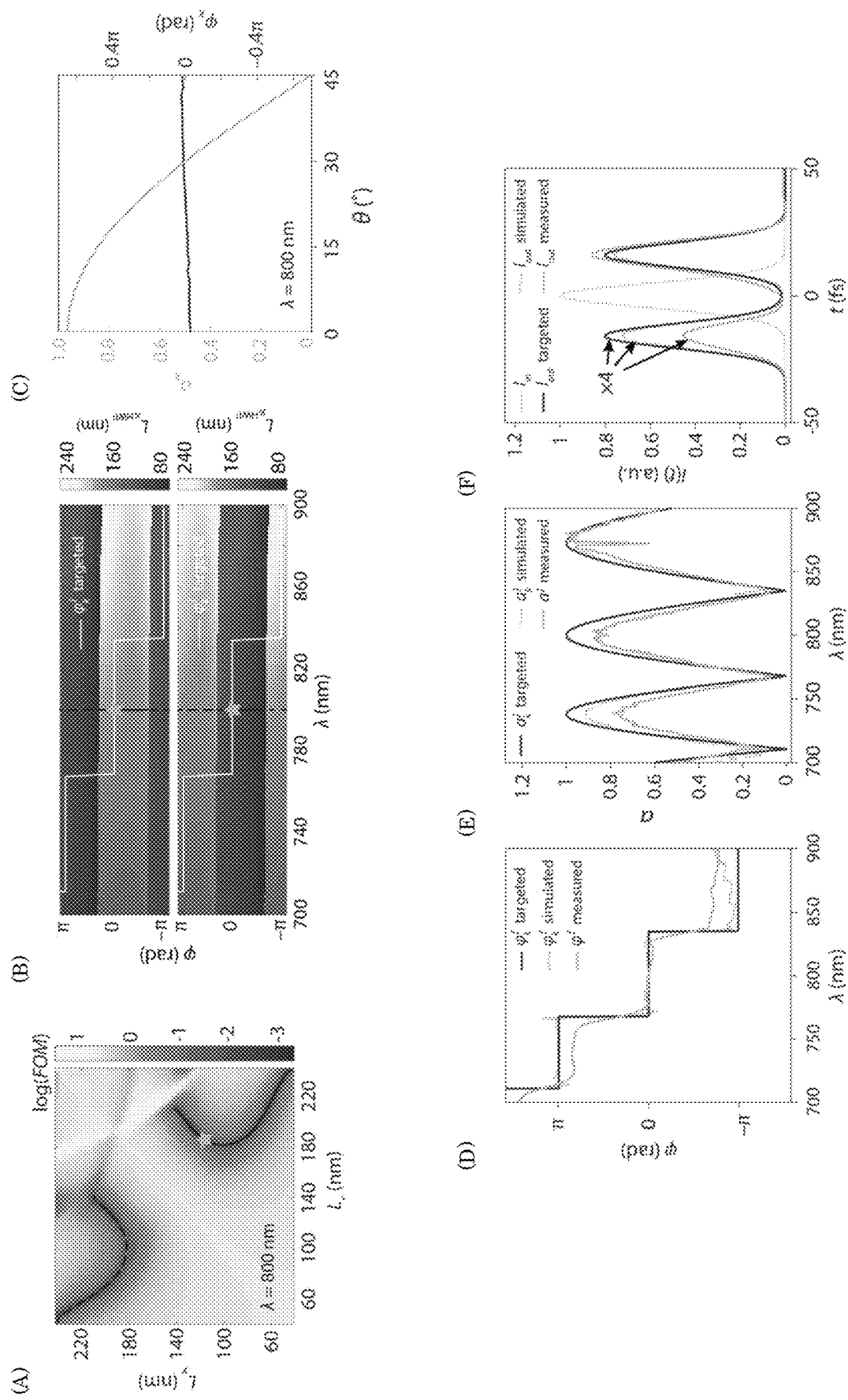
FIG. 12 shows aspects of ultrafast optical pulse shaping using a dielectric metasurface according to Example 1. (A) Half-waveplate figure of merit vs. nanopillar in-plane dimensions ($L_x$, $L_y$), plotted here in logarithmic scale at a targeted wavelength $\lambda$=800 nm. Loci of optimal performance ($L_{x,HWP}$, $L_{y,HWP}$), indicated by dashed and solid black paths, are given by the local minima of FOM. The optimal locus yielding the targeted phase shift $\varphi$=0 at $\lambda$=800 nm is indicated by the red star ($L_x$=185 nm and $L_y$=114 nm). (B) Colormaps depicting the values of $L_x$ and $L_y$ minimizing FOM vs. phase shift $\varphi \in [-\pi, \pi]$ and wavelength $\lambda \in [700$ nm, 900 nm]. The dashed and solid black lines at $\lambda$=800 nm are the optimal values ($L_{x,HWP}$, $L_{y,HWP}$) transposed from panel A; the red-stars, also transposed from panel A, indicate the loci of targeted phase shift $\varphi$=0. (C) Super-pixel conferred amplitude $a_k$ and phase $\varphi_k$ vs. nanopillar rotation angle $\theta$, assuming $\lambda$=800 nm, and in-plane nanopillar dimensions $L_x$=185 nm and $L_y$=114 nm as calculated by RCWA. (D, E, F) Experimental demonstration of pulse splitting targeting $\Delta t$=30 fs, for an input Gaussian pulse of length 10 fs. The targeted spectral phase $\varphi_k^I$ and transmission amplitude $a_k^I$ required to achieve the desired $\Delta t$ are displayed in panel D and panel E respectively (solid blue lines). The lateral in-plane nanopillar dimensions ($L_{x,k}^I$ and $L_{y,k}^I$) to achieve targeted $\varphi_k^I$ for each super-pixel are obtained using the colormap in panel B (via overlaid solid white line). The rotation angle $\theta_k^I$ for each super-pixel is set to $\cos^{-1}(a_k^I)/2$ to achieve the targeted $a_k^I$. The metasurface designed and implemented with these dimensions yields simulated (dotted red lines) and measured (solid red lines) spectral phases (panel D) and transmission amplitudes (panel E) which closely match the targeted values. Panel F represents the temporal profile of targeted, simulated and measured output pulses (solid blue, dotted red and solid red lines respectively) emerging from a pulse shaper incorporating metasurface I, along with that of the input pulse (solid yellow line).
Figure 18:
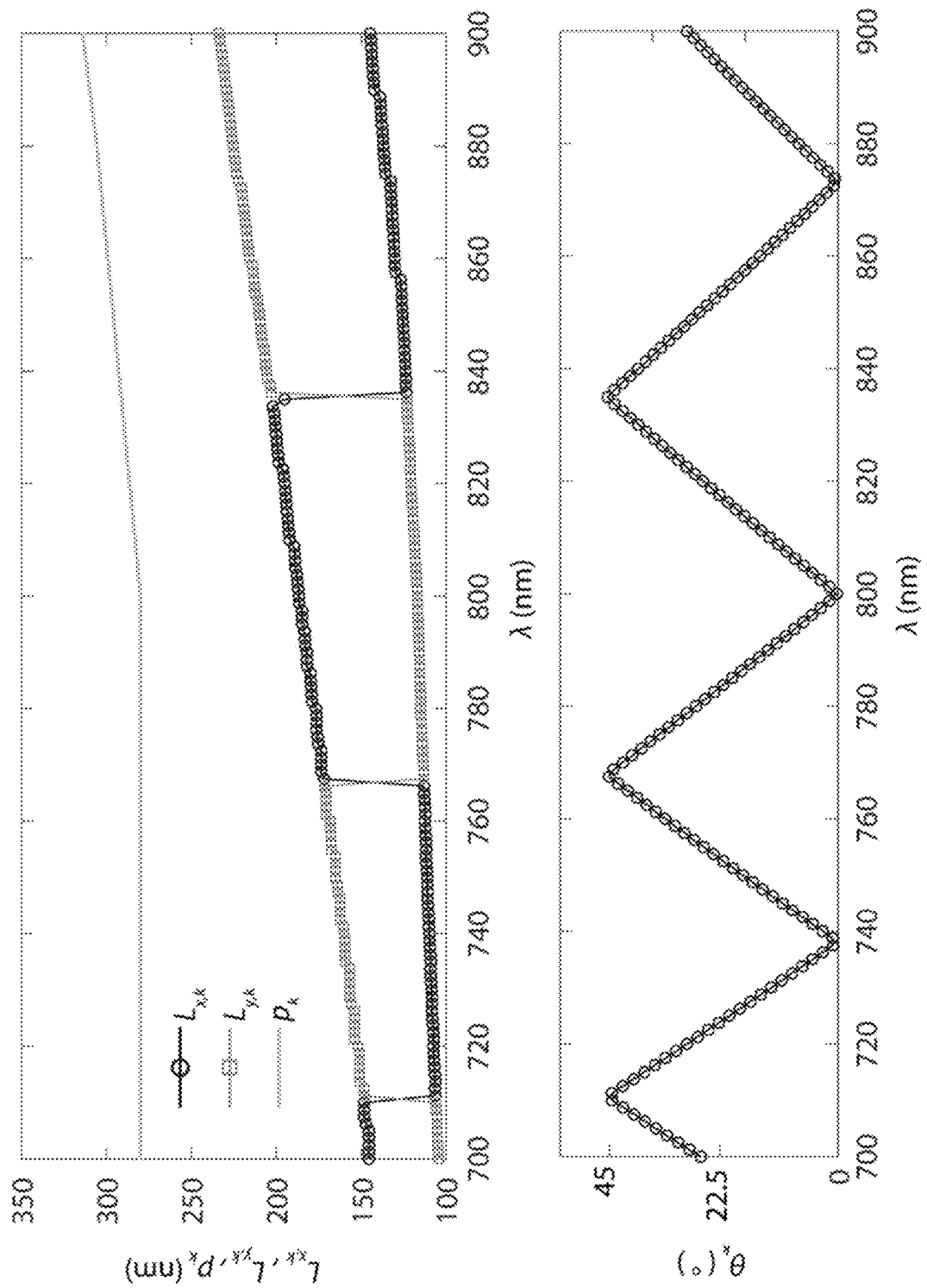
FIG. 18 shows layout design parameters for the pulse splitting metasurface. (A) Nanopillar in-plane dimensions $L_{x,k}$ and $L_{y,k}$, and lattice constant $p_k$ for each super-pixel $S_k$ chosen to implement the targeted spectral phase shift function. (B) Nanopillar rotation angle $\theta_k$ for each super-pixel $S_k$ chosen to implement the targeted spectral amplitude function.
Figure 19:
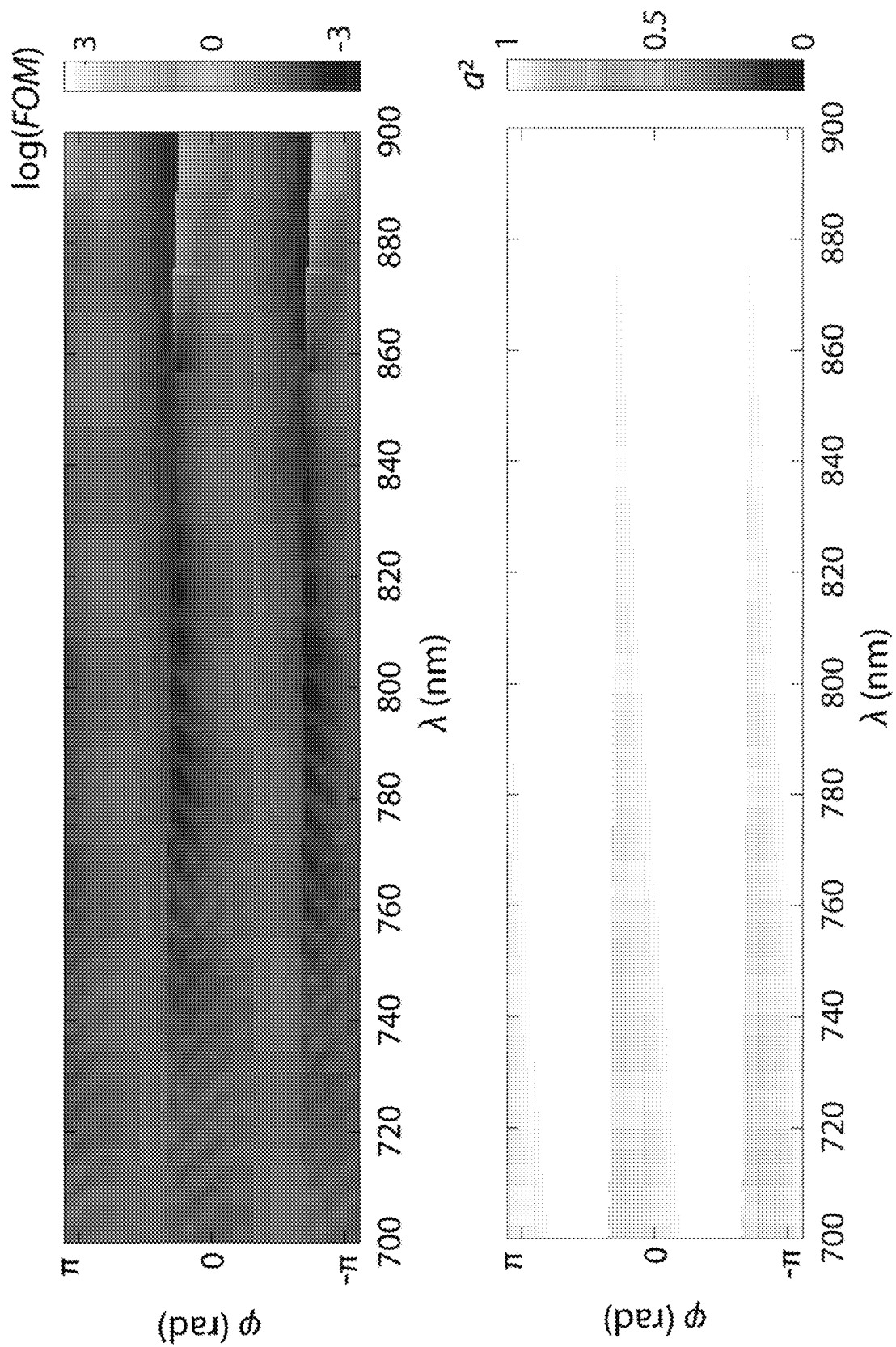
FIG. 19 shows a calculated FOM and power transmittance $a^2$ vs. $\varphi$ and $\lambda$ for a metasurface controlling both amplitude and phase. (A, B) FOM and power transmittance $a^2$ (assuming $\theta=0°$) vs. phase shift $\varphi \in [-\pi, \pi]$ and wavelength $\lambda \in [700$ nm, 900 nm], respectively, calculated for each corresponding $L_{x,HWP}(\varphi,\lambda)$ and $L_{y,HWP}(\varphi,\lambda)$ pairs.

The rectangular silicon nanopillars of each super-pixel $S_k$ are first designed to approximate half-wave plates at the pixel central operating wavelength $\lambda_k$, while providing the specific phase shift $\varphi_k$ targeted for $S_k$ (see FIG. 18 for choice of the lattice constant $p_k$). This is achieved by setting, based on rigorous coupled wave analysis (RCWA,) at each wavelength $\lambda_k$, the in-plane pillar dimensions ($L_x$, $L_y$) to the values that simultaneously yields $\varphi_x=\varphi_k$ and a local minimum of the figure-of-merit function FOM given by:

$$FOM(L_x, L_y) = \left| \frac{a_x(L_x, L_y)e^{i\varphi_x(L_x,L_y)}}{a_y(L_x, L_y)e^{i\varphi_y(L_x,L_y)}} - e^{i\pi} \right|^2, \qquad (4)$$

where $a_x$ and $a_y$ represent the transmission amplitude of a given pillar at $\theta$=0° and 90° respectively. The result of this minimization operation yields, at each wavelength $\lambda_k$, a parametric curve ($L_{x,HWP}(\varphi_k)$; $L_{y,HWP}(\varphi_k)$) where $\varphi_k \in [-\pi, \pi]$. The resulting curve, displayed for the case $\lambda_k$=800 nm (FIG. 12A), consists of two separate branches (dashed and solid black curves, FIG. 12A). Performing the minimization at all wavelengths $\lambda_k \in [\lambda_{min},\lambda_{max}]$, yields two functions $L_{x,HWP}(\varphi_k, \lambda_k)$ and $L_{y,HWP}(\varphi_k, \lambda_k)$ where $\varphi_k \in [-\pi, \pi]$ (FIG. 12B and FIG. 19). Based on the targeted phase shift function $\varphi_k(\lambda_k)$, these functions are then used to set the nanopillar in-plane dimensions $L_{x,k}$ and $L_{y,k}$ for each super-pixel $S_k$. Finally, to implement the targeted transmission amplitude $a_k$ at each super-pixel $S_k$, the rotation angle of all half-wave plate nanopillars forming $S_k$ is set to $\theta_k=\cos^{-1}(a_k)/2$. Numerical simulations of $\varphi_k$ over the nanopillar rotation range $\theta_k \in [0, 45°]$ confirm the relative independence of $\varphi_k$ from $\theta_k$ (and hence from $a_k$), as demonstrated for the specific case of a nanopillar array optimized for half-wave plate operation at $\lambda_k$=800 nm and targeted phase shift $\varphi_k$=0 (FIG. 12C).

Figure 9:
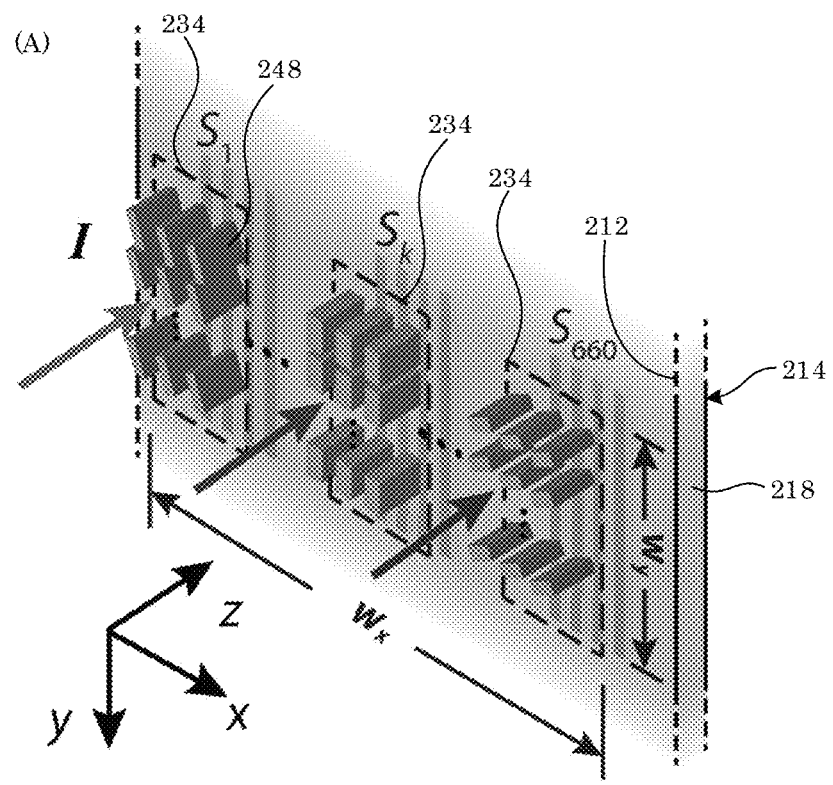
FIG. 9 shows, in panel A, a prospective view of super-pixels of a metasurface optical pulse shaper in which a metasurface (labelled I) splits an optical pulse into two time-separated replicas with separation $\Delta t$=30 fs. The metasurface (length $w_x$=2.2 cm and width $w_y$=300 m) includes N=660 super-pixels each including an array of nanopillars with rectangular in-plane cross-section and specific angular orientation (represented by orange cuboids) backed by an Al wire-grid polarizer (represented by blue vertical lines). Panel B shows a prospective view of superpixels of a metasurface optical pulse shaper, wherein an SEM image of metasurface I shows a detail of the arrays of Si nanopillars at the boundary between super-pixels $S_{34}$ and $S_{35}$, and a scale bar represents 1 μm.
Figure 9:
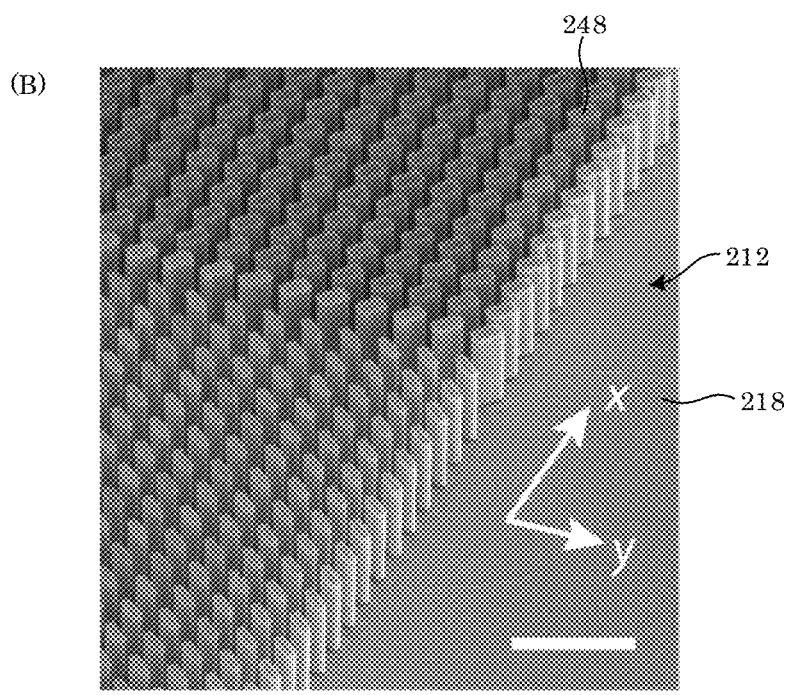

Having mapped the full set of possible phase, transmission amplitude and wavelength combinations ($\varphi_k$, $a_k$, and $\lambda_k$) to the corresponding set of nanopillar geometric parameters ($L_{x,k}$, $L_{y,k}$, and $\theta_k$), we implement, as an illustrative example of the flexibility of simultaneous spectral phase and amplitude manipulation, a half-waveplate-based metasurface (designated as metasurface I) which enables the Fourier-transform pulse shaper to split a single optical pulse into two replicas time-separated by an interval $\Delta t=30$ fs (FIG. 9). The corresponding time-shift operation can be implemented via a sinusoidal masking modulation $Y(\omega)=\cos\{(\omega-\omega_0/2\Delta\omega\}$, where $\omega_0=2\pi c/\Delta_0$ and $\Delta\omega=2\pi/\Delta t$. The metasurface implementation of the required positive and negative excursions for $Y(\omega)$ is achieved via combination of a targeted stepwise phase function alternating between 0 and $\pi$ with dependence $\varphi_k^I=\varphi^I(\lambda_k)=\arg(Y(2\pi c/\lambda_k))$ (FIG. 12B white line & FIG. 12D) and an always-positive, targeted transmission amplitude $a_k^I=a^I(\lambda_k)=|Y(2\pi c/\lambda_k)|$ (FIG. 12E). The metasurface pillar dimensions and their rotation angles (FIG. 18) for each super-pixel are respectively derived through lookup (FIG. 12B) of the functions $L_{x,k}^I=L_{x,HWP}(\varphi^I(\lambda_k),\lambda_k)$ and $L_{y,k}^I=L_{y,HWP}(\varphi^I(\lambda_k),\lambda_k)$, and setting $\theta_k^I=\cos^{-1}(a_k^I)/2$. RCWA simulations based on these dimensions confirm the targeted phase and amplitude functions (FIG. 12D, E). The fabricated metasurface is characterized, respectively, by a measured spectral phase shift $\varphi^I(\lambda)$ and amplitude $a^I(\lambda)$ which closely match the targeted and simulated values (FIG. 12D, E). Time-domain reconstruction assuming a Gaussian input pulse of length 10 fs yields simulated and measured output pulses (FIG. 12H) having two distinct peaks separated, respectively, by $\Delta t=30.9$ fs and $(30.7\pm0.8)$ fs. Though the peak separation in each case is close to the targeted value, the advanced peak is attenuated with respect to the retarded peak in both the simulated and measured cases, as a result of sub-optimal half-waveplate implementation at shorter wavelengths of the pulse spectrum (FIG. 19).

A common embodiment of pulse shaping in ultrafast science involves compression or stretching of an optical pulse. This can be achieved by utilizing a metasurface designed to impart a constant transmission amplitude $a$ independent of position (i.e. frequency) and a spatially-varying phase $\varphi(x)$, yielding a phase-only masking function $Y_P(x)$ given by:

$$Y_P(\omega(x))=ae^{i\varphi(x)}. \quad (5)$$

Figure 13:
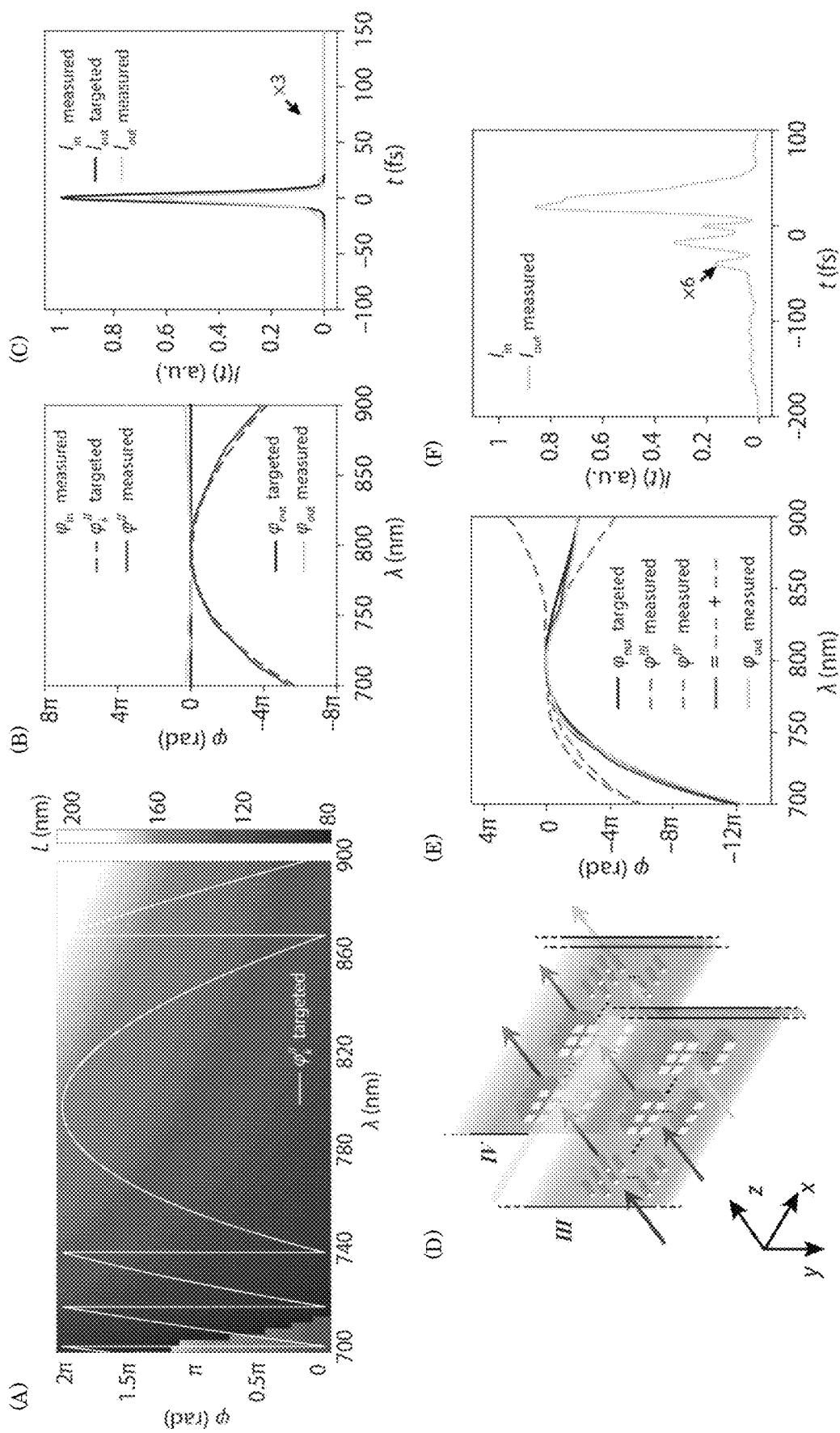
FIG. 13 shows (A) a colormap depicting values of nanopillar side-length L vs. phase shift $\varphi \in [0, 2\pi]$ and wavelength $\lambda \in [700$ nm, 900 nm], calculated using the RCWA method. (B) Characterization of salient spectral phases of pulse compression enabled by metasurface II. $\varphi_{in}$ (solid yellow line): measured spectral phase of the positively chirped input pulse to the pulse shaper. $\varphi_{out}$, targeted (solid blue line): spectral phase of targeted transform limited output pulse. $\varphi_k^{II}$ (dashed green line): quadratic metasurface phase map approximating $-\varphi_{in}$ to achieve targeted $\varphi_{out}$. The corresponding in-plane nanopillar dimensions ($L_k^{II}$) to achieve targeted $\varphi_{out}$ for each super-pixel are obtained using the colormap in panel A (via overlayed solid white line). $\varphi^{II}$, measured (solid green line): experimentally characterized metasurface induced spectral phase shift closely matching targeted $\varphi_k^{II}$. $\varphi_{out}$, measured (solid red line): spectral phase of the pulse emerging from the pulse shaper closely matching targeted $\varphi_{out}$ representative of a transform limited pulse. (C) Temporal profile of the targeted and measured output pulse (solid blue and solid red lines respectively) emerging from the pulse shaper incorporating metasurface II given the positively chirped input pulse (solid yellow line). (D) Schematic diagram of a cascaded sequence of phase control metasurfaces, respectively quadratic (labelled III) and cubic (labelled IV), implemented to impart a third-order polynomial phase function to a transform limited optical pulse of length≈10 fs. The general layout of each metasurface is the same as depicted in panel B. (E) Characterization of salient spectral phases for distortion of a transform limited pulse enabled by metasurfaces III and IV individually and in a cascaded configuration. $\varphi_{out}$, targeted (solid blue line): given by $\varphi_{out}(\lambda)=\beta^{III}(\omega(\lambda)-\omega_0)^2+\beta^{IV}(\omega(\lambda)-\omega_0)^3$ where $\beta^{III}$=-2.0× $10^{-4}$ rad$^{-1}$·ps$^2$ and $\beta^{IV}$=-4.0×$10^{-7}$ rad$^{-2}$·ps$^3$. $\varphi^{III}$ and $\varphi^{IV}$, measured (dashed magenta and cyan lines, respectively): measured spectral phase shifts induced by metasurfaces III and IV individually, designed to match $\varphi_k^{III}=\beta^{III}(\omega(\lambda_k)-\omega_0)^2$ and $\varphi_k^{IV}=\beta^{IV}(\omega(\lambda_k)-\omega_0)^3$ respectively. $\varphi^{III}$, measured +$\varphi^{IV}$, measured (solid green line): spectral phase shift mathematically predicted for cascaded metasurfaces III and IV. $\varphi_{out}$, measured (solid red line): spectral phase of the pulse emerging from the pulse shaper, closely matching targeted $\varphi_{out}$. (F) Temporal profile of the measured output pulse (solid red line) emerging from the pulse shaper incorporating cascaded metasurfaces III and IV given a transform limited input pulse (solid yellow line)
Figure 20:
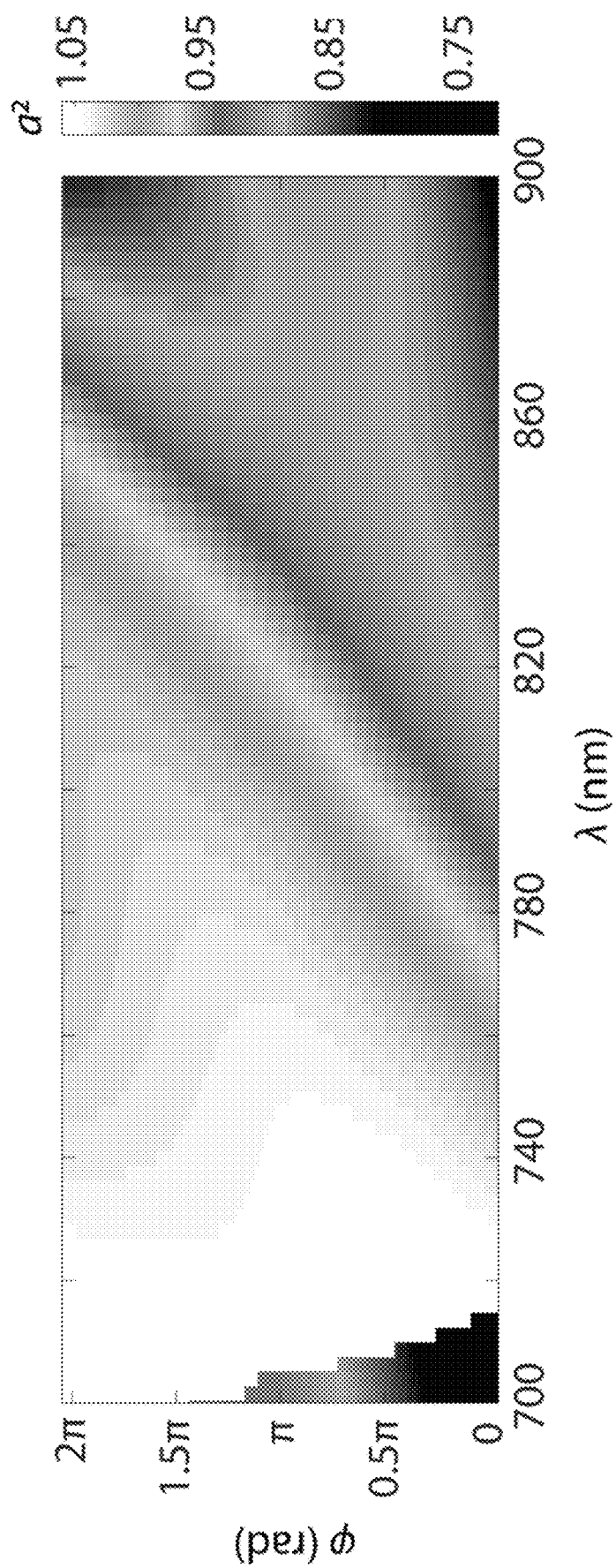
FIG. 20 shows a calculated power transmittance $a^2$ vs. $\varphi$ and $\lambda$ for a metasurface controlling only phase. Power transmittance $a^2$ vs. phase shift $\varphi \in [0, 2\pi]$ and wavelength $\lambda \in [700$ nm, 900 nm], calculated for every corresponding $L(\varphi,\lambda)$.

Near-unity transmission amplitude, $a\approx1$, is achieved by setting, for each super-pixel $S_k$, the nanopillar rotation angle to $\theta_k=0$. Eliminating the wire-grid polarizer, which is no longer required for a phase-only masking function, furthermore helps maximize the absolute transmission amplitude. Finally, phase-only operation relaxes the restriction that the nanopillars act as half-waveplates, and therefore the requirement that $L_{x,k}$ and $L_{y,k}$ be set to different values. Setting $L_{x,k}=L_{y,k}=L_k$ for all nanopillars of any given super-pixel $S_k$ simplifies the metasurface design procedure by reducing the parameter optimization space to one dimension. Using RCWA simulations assuming lattice constant $p=\lambda/2$, the nanopillar induced complex transmission $ae^{i\varphi}$ is calculated as a function of nanopillar side length $L$ and wavelength $\lambda$, where $\lambda\in[\lambda_{min}, \lambda_{max}]$, and $L\in[0, \lambda/2]$. This calculation yields a near-unity amplitude transmission function $a(\varphi,\lambda)$ (FIG. 20), along with a phase shift function $\varphi(L,\lambda)$ which spans the full range $[0, 2\pi]$ and can be inverted to provide a nanopillar dimension lookup function $L(\varphi,\lambda)$ (FIG. 13A).

Figure 10:
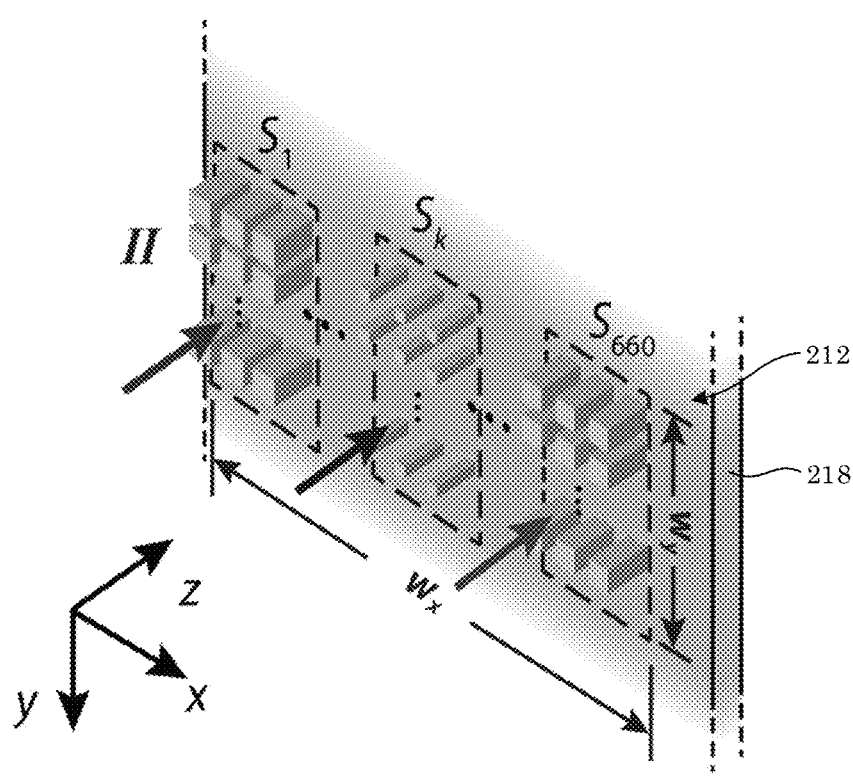
FIG. 10 shows, in panel A, a prospective view of super-pixels of a metasurface optical pulse shaper in which a phase-control metasurface (labelled II) compresses a positively chirped optical pulse of length≈73 fs to its transform limit. The metasurface (length $w_x$=2.2 cm and width $w_y$=300 m) includes N=660 super-pixels, each including an array of nanopillars with square in-plane cross-section (represented by orange cuboids). Panel B shows a prospective view of superpixels of a metasurface optical pulse shaper, wherein an SEM image of metasurface II shows a detail of the array of Si nanopillars within super-pixel $S_{67}$, and a scale bar represents 500 nm.
Figure 10:
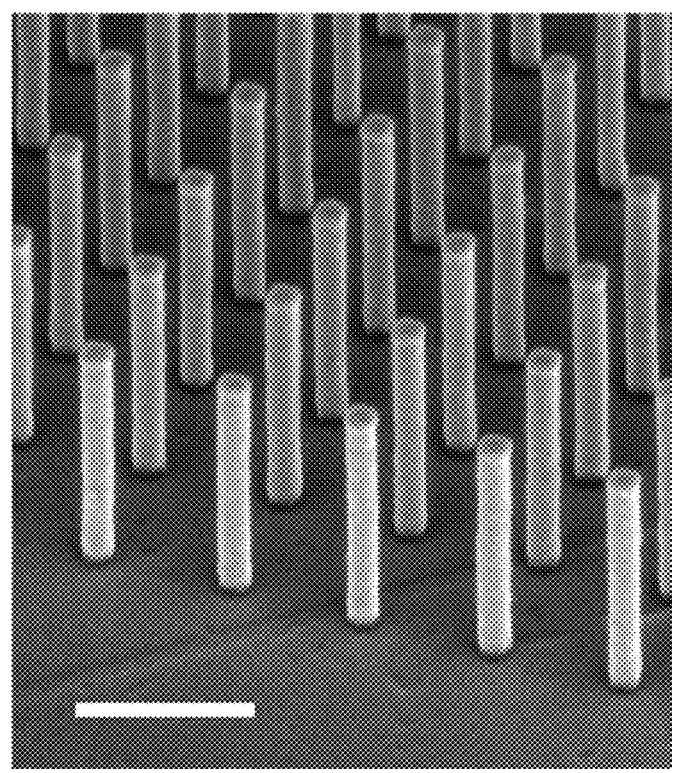
Figure 21:
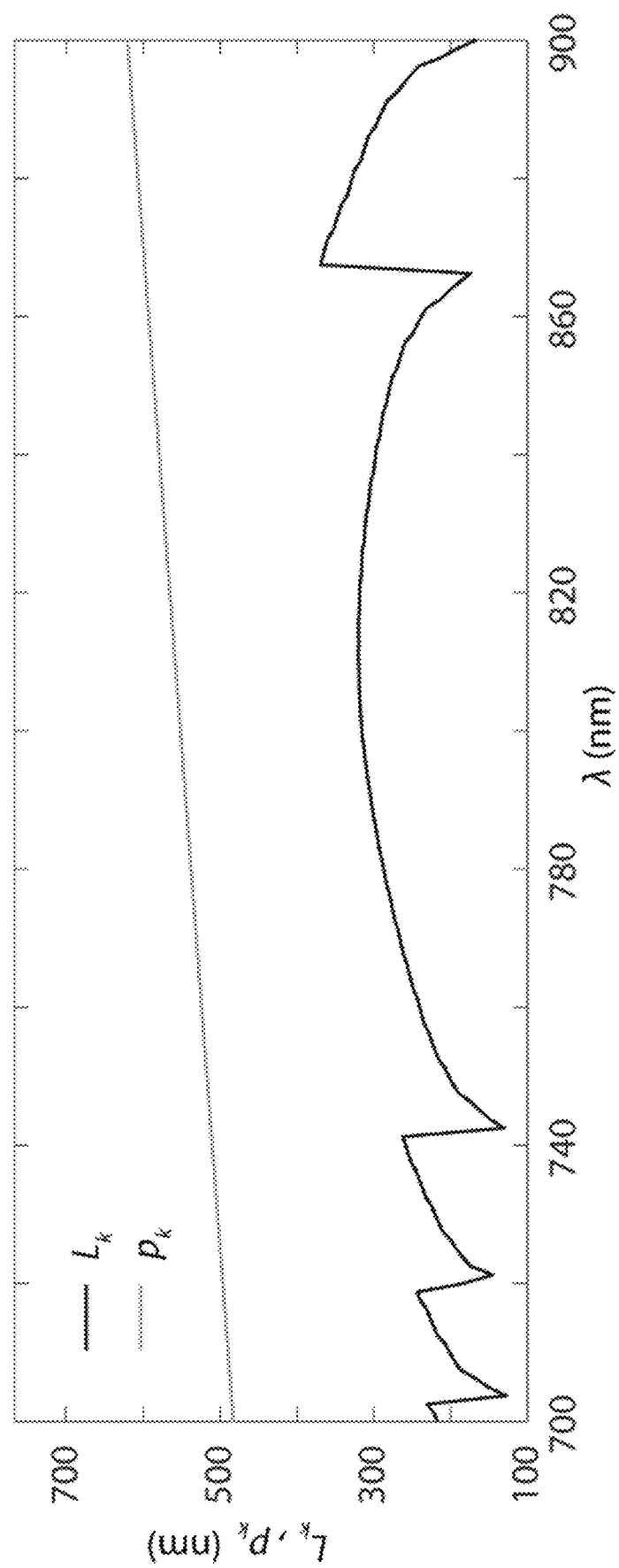
FIG. 21 shows layout design parameters for pulse compression metasurface II. Nanopillar in-plane dimension $L_k$ and lattice constant $p_k$ for each super-pixel $S_k$ chosen to implement the targeted spectral phase shift function $\varphi^{II}(\lambda)$.

Having determined $L(\varphi,\lambda)$, we implement and demonstrate, as an example of metasurface-enabled dispersion engineering, a phase-control metasurface (designated as metasurface II), that can compress a positively chirped optical pulse to its transform limit (FIG. 10). Such an input pulse is generated by passing a 10-fs-wide transform-limited pulse through a 5-mm-thick glass slab, yielding a spectral phase $\varphi_{in}(\lambda)$ with an upward-opening, approximately quadratic shape (FIG. 13B)—characteristic of normal material dispersion—and a time-stretched, chirped pulse of length$\approx$73 fs (FIG. 13C). This dispersion can be compensated to the lowest order using a phase-control metasurface with a quadratic phase function $\varphi^{II}(\lambda)$ approximating the function $-\varphi_{in}(\lambda)$. A least square fit assuming $\varphi^{II}(\lambda)=\beta^{II}(\omega(\lambda)-\omega_0)^2$, where $\omega(\lambda)=2\pi c/\lambda$, yields weighting factor $\beta^{II}=-1.5\times10^{-4}$ rad$^{-1}\cdot$ps$^2$ (FIG. 13B). The metasurface pillar dimensions for each super-pixel (FIG. 21) are set by computing the function $L_k^{II}=L(\varphi^{II}(\lambda_k),\lambda_k)$, where $\varphi^{II}(\lambda_k)$ is graphically represented by the solid white line in FIG. 9B, yielding an implemented phase shift of $\varphi_k^{II}=\varphi^{II}(\lambda_k)$ for each super-pixel $S_k$, where $k=1$ to N. The output pulse emerging from the metasurface-enabled pulse shaper is characterized, as targeted, by a flat spectral phase function $\varphi_{out}(\lambda)=(\varphi_{in}(\lambda)+\varphi^{II}(\lambda))$ (FIG. 13B) and a temporal pulse width $(10.6\pm0.3)$ fs, approximating recompression of the pulse to its transform-limited state prior to passage through the glass slab (FIG. 13C). The pulse compression achieved here demonstrates the ability of a single phase-control metasurface to compensate for normal dispersion via a tailored anomalous dispersion transformation.

Figure 22:
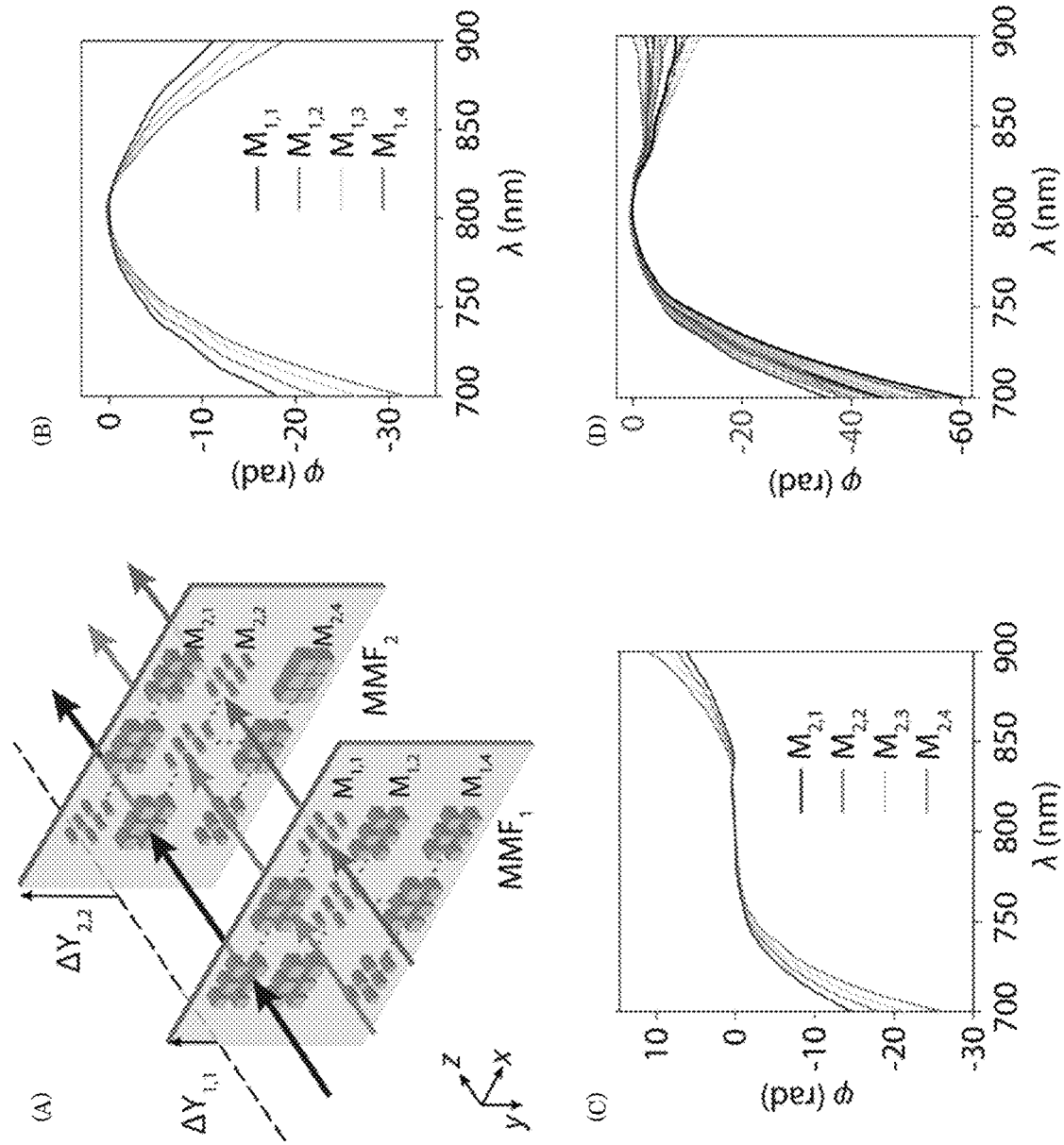
FIG. 22 shows a reconfigurable synthesis of finely tailored spectral phase functions enabled by cascading multi-masking-function (MMF) metasurfaces. (A) Schematic diagram of a spectrally dispersed pulse propagating through two cascaded metasurfaces M1,1 and M2,2 located on separate MMF samples, respectively quadratic (labelled "MMF1") and cubic (labelled "MMF2"). The top edge of each matrix is shifted from the plane of the beam by distances $\Delta Y_{1,1}$ and $\Delta Y_{2,2}$ respectively. (B) Four quadratic masking functions $Y_{1,j}(x)=e^{i\varphi_{1,j}(\omega(x))}$ (j=1, 2, 3, and 4) implemented on MMF1, where $\varphi_{1,j}(\omega)=-\beta_{1,j}(\omega-\omega_0)^2$, $\beta_{1,1}=1.5\times 10^{-4}$ rad$^{-1}$·ps$^2$, $\beta_{1,2}=1.8\times 10^{-4}$ rad$^{-1}$·ps$^2$, $\beta_{1,3}=2.0\times 10^{-4}$ rad$^{-1}$·ps$^2$, and $\beta_{1,4}=2.3\times 10^{-4}$ rad$^{-1}$·ps$^2$. (C) Four cubic masking functions $Y_{2,j}(x)=e^{i\varphi_{2,j}(v(x))}$ (j=1, 2, 3, and 4) implemented on MMF2, where $\varphi_{2,j}(\omega)=-\beta_{2,j}(\omega-\omega_0)^3$, $\beta_{2,1}=3.2\times 10^{-7}$ rad$^{-1}$·ps$^3$, $\beta_{2,2}=4.0\times 10^{-7}$ rad$^{-1}$·ps$^3$, $\beta_{2,3}=4.8\times 10^{-7}$ rad$^{-1}$·ps$^3$, and $\beta_{2,4}=5.6\times 10^{-7}$ rad$^{-1}$·ps$^3$. (D) 16 spectral phase shift masking functions available through cascading MMF1 and MMF2 depicting all the possible combinations of $Y_{1,j}$ and $Y_{2,j}$.

Ultrafast pulses with phase functions having both quadratic and higher-order terms are widely exploited in applications such as quantum coherent control and pulse stretching. We demonstrate how a metasurface-enabled pulse shaper embedding a series of cascaded phase-control metasurfaces can implement an arbitrary higher-order polynomial phase function, where each term of the polynomial is implemented by one of the metasurfaces. As an illustrative example, a targeted third-order spectral phase function, $\varphi_{targeted}(\lambda)=\beta^{III}(\omega(\lambda)-\omega_0)^2+\beta^{IV}(\omega(\lambda)-\omega_0)^3$, is implemented by inserting into the focal volume of the pulse shaper two cascaded metasurfaces (designated as metasurfaces III and IV, FIG. 13D) having the same number of super-pixels ($k=1$ to N) and respectively configured to confer quadratic and cubic spectral phase shifts $\varphi_k^{III}=\beta^{III}(\omega(\lambda_k)-\omega_0)^2$ and $\varphi_k^{IV}=\beta^{IV}(\omega(\lambda_k)-\omega_0)^3$ at each super-pixel, where $\beta^{III}=-2.0\times10^{-4}$ rad$^{-1}\cdot$ps$^2$ and $\beta^{IV}=-4.0\times10^{-7}$ rad$^{-2}\cdot$ps$^3$. Characterization of the spectral phase shift imparted by the pulse shaper, using a transform-limited pulse as input, yields the spectral dependence $\varphi_{out}(\lambda)\approx\varphi_{targeted}(\lambda)$, confirming implementation of the targeted third-order polynomial phase function (FIG. 13E). The time-domain waveforms (FIG. 13F) reveal stretching and anomalous dispersion of the output pulse with respect to the input pulse—due to the quadratic component of the phase function, along with higher-order distortion as evidenced by the appearance of wiggles at the leading edge of the pulse—due to the cubic phase component. For reference, the spectral phase for metasurface III only ($\varphi^{III}$) and metasurface IV only ($\varphi^{IV}$) are individually characterized (FIG. 13E), yielding $\varphi^{III}(\lambda)+\varphi^{IV}(\lambda)\approx\varphi_{out}(\lambda)$, consistent with the assumption of linearity underlying the cascaded-metasurface pulse shaping scheme. Given the elongated shape of a pulse-shaping metasurface in the x-direction, it is then straightforward to implement a multi-masking-function (MMF) sample formed of multiple metasurfaces arrayed in the y-direction on the same fused silica substrate. This allows, for example, implementation of two MMF samples consisting, respectively, of parallel arrays of quadratic and cubic metasurfaces with different weighting factors $\beta$. Cascading the two samples in the focal volume of the pulse shaper and translating a specific metasurface of each sample into the beam enables reconfigurable synthesis of a finely tailored third-order polynomial phase function (FIG. 22).

In summary, we have demonstrated shaping of the temporal profile of a large-bandwidth, near-infrared optical pulse by leveraging transmission-mode, planar silicon metasurfaces able to simultaneously and independently control the amplitude and phase of the constituent frequency components of the pulse. A variety of pulse shaping operations are implemented, such as pulse splitting, pulse compression, pulse chirping, and higher-order distortion. Each metasurface implemented here contains approximately $5 \times 10^4$ dielectric nanopillars in one row along the x-direction, yielding a theoretically achievable lower limit on the spectral resolution of ≈1.9 GHz. By further configuring the metasurface pixel array to accommodate and process spectra dispersed to two spatial dimensions, we expect that the number of individually controllable spectral features can be increased by several orders of magnitude, thereby allowing line-by-line shaping of frequency combs with ultranarrow comb spacing and ultrawide bandwidth. Expanding metasurfaces into the realm of time-domain manipulation will amplify the already significant impact of their application as two-dimensional wavefront shapers, and open new vistas in the field of ultrafast science and technology.

Example 2. Femtosecond Pulse Shaping by Metasurfaces

Metasurfaces provide extremely fine spatial control over the amplitude and phase of incident light, and the metasurface shapes a sub-15 femtosecond ultrafast laser pulse with a silicon-metasurface acting as both spectral amplitude and phase mask. Ultrafast optical science and technology depend on optical pulse shaping, which compliments pulse generation and characterization methods. Example applications for pulse shaping include pulse compression, dispersion compensation for fiber optic communications, coherent laser control of quantum mechanical processes, and spectrally selective nonlinear microscopy. Fourier-transform pulse shaping has emerged as the most successful and widely adopted technique, in which shaping is achieved by parallel modulation of spatially separated frequencies without requiring an ultrafast modulator. A typical component of this technique is a spatial light modulator (SLM) or digital micromirror device (DMD), which offers dynamic phase control but at significant cost and limited spatial size and resolution. Dielectric metasurfaces provide arbitrary control over the amplitude, phase, or polarization of light in a single, compact optical element, and the metasurface provides femtosecond pulse shaping with a centimeter-scale silicon metasurface acting as both amplitude and phase modulation mask. Deep-subwavelength silicon nanostructures, positioned with nanometer precision, provide accurate amplitude and phase modulations to each frequency component. Masks of this type offer a lower cost, larger size, higher resolution, high diffraction efficiency, high damage threshold method for controlling ultrafast pulses.

Figure 23:
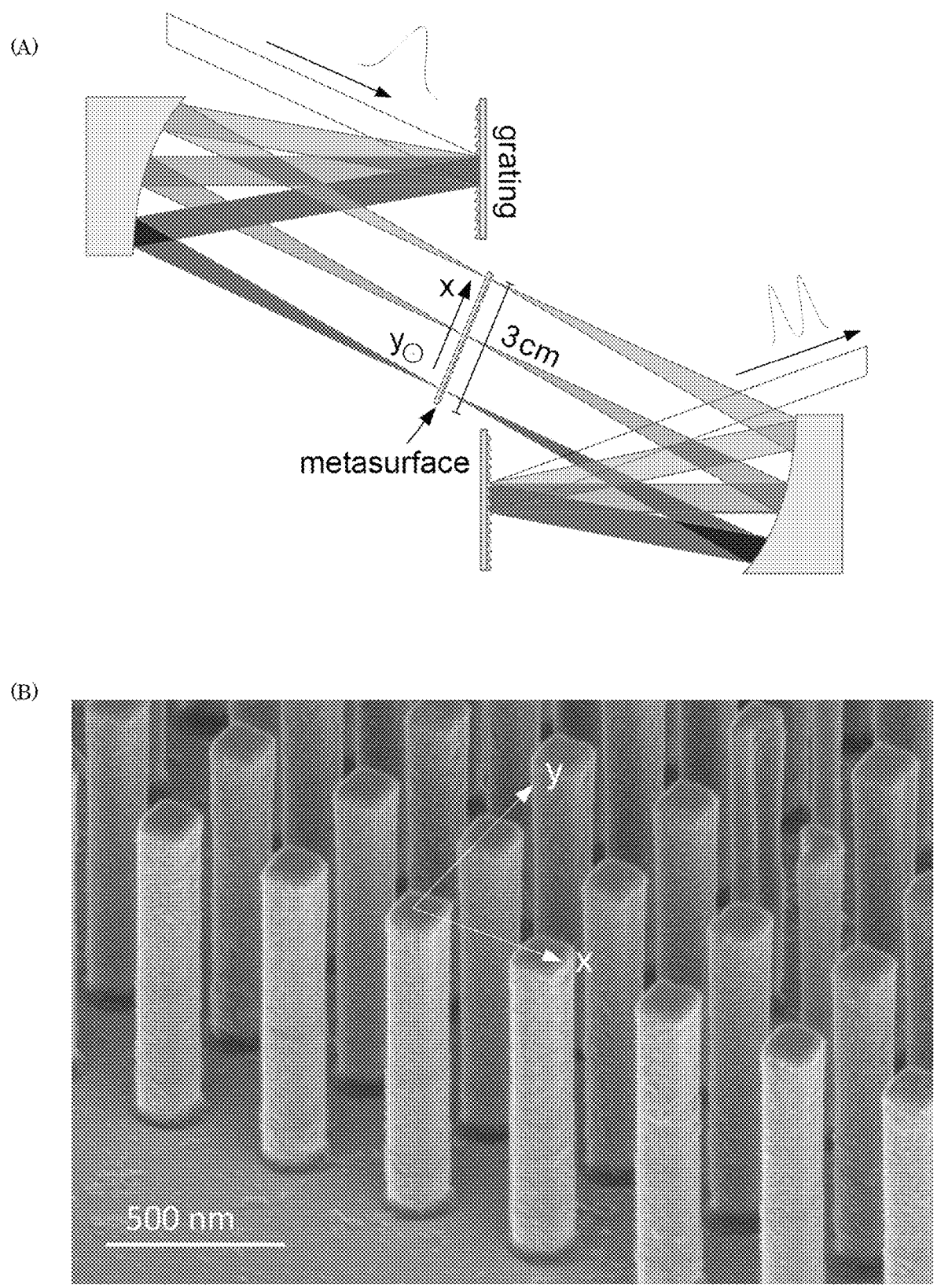
FIG. 23 shows panel A, shows a metasurface optical pulse shaper that provides Fourier-transform pulse shaping, and panel B shows a scanning electron micrograph of silicon nanopillars of a metasurface.
Figure 24:
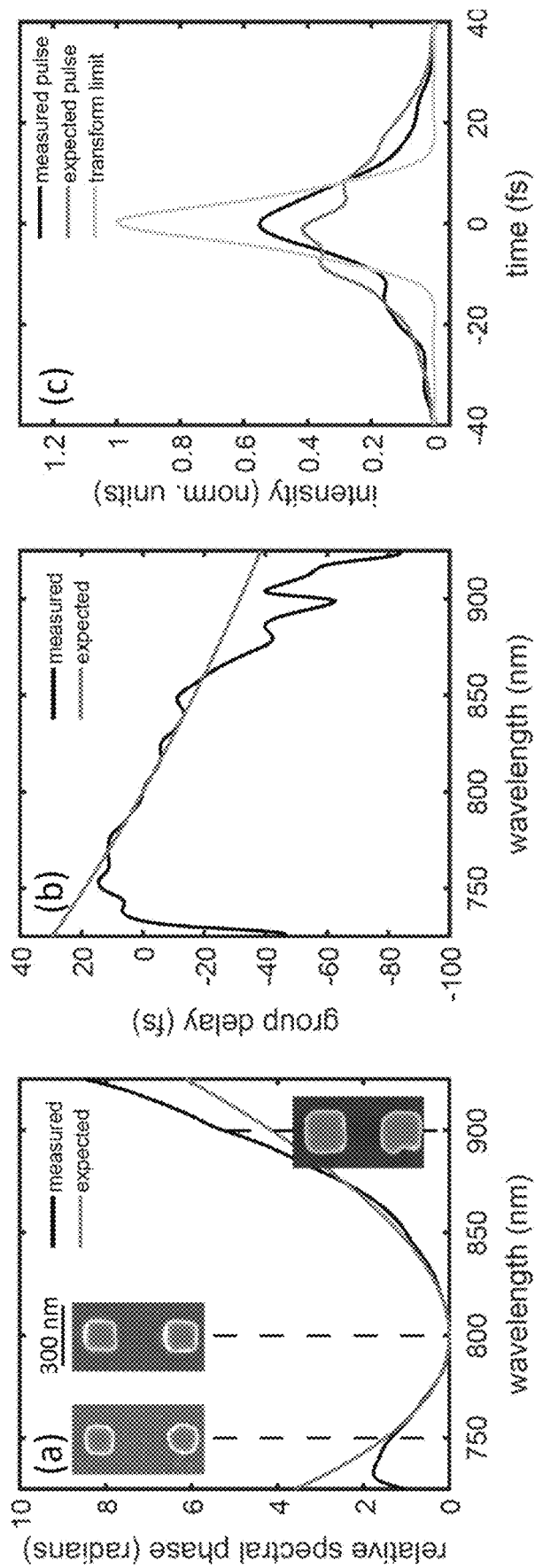
FIG. 24 shows, in panel A, a graph of relative spectral phase versus wavelength for a measurement of quadratic spectral phase applied by a metasurface pulse shaper as a function of wavelength (blue) and the phase expected by design (red), wherein the inset cross-sections indicate the size of nanopillars at the target wavelength (dashed line); panel B shows measured (blue) and expected (red) group delay, computed from data shown in panel A applied to an input pulse as a function of wavelength, and panel C shows measured input (yellow) and output (blue) pulse intensities as a function of time, corresponding to spectral phase given in (panel A, blue), normalized to the input pulse maximum, and expected pulse (red) computed from the input power spectrum and expected spectral phase given in panel A.

FIG. 23, panel A, shows a metasurface optical pulse shaper that provides Fourier-transform pulse shaping. A femtosecond optical pulse (<15 fs) from a Ti:Sapphire oscillator covering the spectral range from 725 nm to 925 nm is angularly dispersed by the first grating and then focused by an off-axis parabolic mirror. At the focal plane of this parabolic mirror the frequency components of the laser pulse are spatially separated along one dimension. A dielectric metasurface mask positioned at this focal plane can introduce amplitude and phase modulation to each spectral component. The optical beam is then re-collimated and recombined by a second parabolic mirror and grating pair. The characteristics of the shaped optical pulse, i.e., spectral amplitude and phase, can then be measured using the SPIDER technique. The metasurface masks are composed of an array of polycrystalline silicon pillars resting on a fused-silica substrate as shown in panel B of FIG. 23. Polycrystalline silicon was selected for its large refractive index and low optical absorption within the spectral range of the femtosecond pulse. The pillars are 1 mm tall with widths ranging from 110 nm to 180 nm. See panel B of FIG. 23 and panel A of FIG. 24. The total length (along the x-axis) of the metasurface, approximately 3 cm as shown in panel A of FIG. 23, corresponds to the spectral bandwidth of the incoming femtosecond pulse. The width (along the y-axis), approximately 300 mm, is large enough to contain the vertical spread of the focused, dispersed beam at the focal plane of the first parabolic mirror. The rectangular pillars that form the metasurface are placed in a two-dimensional array. Each column of pillars along the y-axis introduces a designed phase to a narrow spectral range around a target wavelength, as indicated by each inset of panel A of FIG. 24. Within each column the unit cells are equally spaced with a pitch distance of about half of the corresponding target wavelength. This pitch distance also determines the spacing between each adjacent column. The cross-section of each pillar, examples of which are shown in panel A of FIG. 24, is chosen via an optimization algorithm to achieve the designed spectral phase shift while maintaining a large transmittance. The algorithm chooses square pillars unless a resonance is encountered, in which case rectangular pillars are used where the width is fixed at 100 nm. The pillars provide a phase depth of 2p radians such that phase wrapping is necessary to impart the given phase function. An example metasurface design is given in red in panel A of FIG. 24, which imparts a pure quadratic phase (as a function of frequency). This mask is designed to introduce the equivalent of normal optical dispersion to an incoming optical pulse, as shown in red in the group delay plotted in panel B of FIG. 24. This design would generate enough dispersion to stretch a pulse from 15 fs to 40 fs, as indicated by the measured input (yellow, transform limit) and expected output (red) pulses in panel C of FIG. 24. The measured spectral phase, group delay, and pulse shape applied by a representative, fabricated device are given in blue in panels A-C of FIG. 24, respectively. The measured curves agree with the expected curves in each plot, although deviations start to occur at the edges of the spectrum. We will discuss our recent results of independent amplitude (through polarization) and phase shaping using metasurfaces.

The metasurface optical pulse shaper provides optical pulse shaping and includes a metasurface for spectral and amplitude phase modulation. The high precision with which metasurfaces can control polarization, amplitude, and phase overcomes technical limitations of conventional devices and previously unrealizable applications in optical pulse shaping.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A metasurface optical pulse shaper for shaping a primary optical pulse in a temporal domain, the metasurface optical pulse shaper comprising:
   a metasurface comprising:
      a plurality of superpixels that:
         receives a plurality of primary frequency waves, the primary frequency waves being separated spatially by frequency, and individual primary frequency waves comprise a primary frequency and a primary phase;
         changes a relative phase of the primary frequency waves to produce shaped phases; and
         produces, from the primary frequency waves, a plurality of phase waves that are separated spatially by frequency and phase, individual phase waves comprising:
            the primary frequency of the primary frequency wave from which the phase wave was produced; and
            a shaped phase,
            wherein at least one of the plurality of shaped phases is different among the shaped phases;
         each superpixel comprises a plurality nanopillars;
         individual nanopillars comprise a dielectric;
         the nanopillars in each superpixel are arranged on a substrate in an identical in-plane rotation angle $\theta_k$ on the substrate in a lattice with lattice constant $p_k$ of identical dielectric nanopillars having the same shape of cross-section and same height for all nanopillars in the superpixel, with each superpixel providing a phase-delay as a polarization-manipulating waveguide;
         the nanopillars in adjacent superpixels have different in-plane rotation angles on the substrate, so that adjacent superpixels:
            are configured to interact with different primary frequencies,
            produce a different phase shift; and
            receive different primary frequencies;
      the substrate comprising:
         an entry surface that receives a plurality of phase waves from the superpixels; and
         an exit surface that communicates the phase waves,
      the substrate producing a plurality of shaped frequency waves such that, from an individual phase wave, a shaped frequency wave is produced and comprises:
         the primary frequency, the shaped phase, and a shaped polarization,
         the shaped frequency waves being separated spatially by frequency and phase;
      the superpixels being disposed on the entry surface, and
      the primary optical pulse comprising a primary shape, such that:
   the metasurface:
      provides arbitrary tailoring of a temporal profile of the primary pulse and controls a spectral phase and an amplitude of the primary frequency waves;
      imparts spatially-varying phase $\varphi(x)$ and transmission amplitude $a(x)$ to lateral positions on the superpixels of a focal spot comprising the primary frequency waves corresponding to different wavelengths according to a masking function Y as $$Y(\omega(x))=a(x)e^{i\varphi(x)},$$

wherein $\omega(\chi)=2\pi c/\lambda(\chi)$, and c is the speed of light in free-space, with the metasurface divided into N superpixels that are contiguously arranged over a distance along an x-direction, where each super-pixel $S_k$ (k=1, 2, ... N, centered at position $x_k$) is designed to impart phase shift $\varphi_k=\varphi(x_k)$ and transmission amplitude $a_k=a(x_k)$ to a k-th wavelength subrange, centered at $\lambda_k=\lambda(x_k)$, of N consecutive subranges including a full spectrum of the primary pulse so that the plurality of superpixels provide the metasurface optical pulse shaper with N independently controllable spectral subranges of respective bandwidth; and
   the phase shift $\varphi_k$ and transmission amplitude factor $a_k$ imparted by each superpixel k is set by in-plane dimensions ($L_{x,k}$ and $L_{y,k}$) and in-plane rotation angle $\theta_k$ of the dielectric nanopillars in individual superpixels.

2. The metasurface optical pulse shaper of claim 1, further comprising:
   a wire grid polarizer disposed on the exit surface of the substrate such that the substrate is interposed between the wire grid polarizer and the superpixels,
   the wire grid polarizer comprising:
      an array of parallel, elongated elements disposed on the exit surface; and
      elongated, parallel exit slits occurring between and bounded by neighboring elements,
   wherein the wire grid polarizer:
      receives the phase waves from the substrate;
      controls an amplitude of individual phase waves; and produces the shaped frequency waves such that the shaped frequency waves are separated spatially by frequency, phase, and amplitude.

3. The metasurface optical pulse shaper of claim 1, further comprising:
a primary disperser in optical communication with the superpixels and that:
receives the primary optical pulse;
spatially disperses the primary optical pulse according to frequency; and
produces, from the primary optical pulse, the primary frequency waves.

4. The metasurface optical pulse shaper of claim 3, wherein the primary disperser comprises:
a grating that:
receives the primary optical pulse;
spatially disperses the primary optical pulse according to frequency; and
produces, from the primary optical pulse, the primary frequency waves; and
a mirror that:
receives, from the grating, the primary frequency waves; and
focuses the primary frequency waves into a focal plane such that the superpixels receive the primary frequency waves in the focal plane of the mirror.

5. The metasurface optical pulse shaper of claim 1, further comprising:
a shaped disperser in optical communication with the exit surface of the metasurface and that:
receives the shaped frequency waves from the metasurface;
spatially combines the shaped frequency waves; and
produces, from the combined shaped frequency waves, a shaped optical pulse,
the shaped optical pulse, comprising a secondary shape that is different from the primary shape of the primary optical pulse.

6. The metasurface optical pulse shaper of claim 5, wherein the shaped disperser comprises:
a mirror that:
receives, from the phase wave, the shaped frequency waves; and
spatially focuses the shaped frequency waves into a focal plane;
a grating that:
receives, from the mirror, the shaped frequency waves in the focal plane of the mirror with the shaped frequency waves spatially overlapping;
spatially combines the shaped frequency waves; and
produces, from the shaped frequency waves, the shaped optical pulse.

7. The metasurface optical pulse shaper of claim 1, further comprising a secondary metasurface in optical communication with the metasurface,
wherein the secondary metasurface comprises a plurality of superpixels disposed on a substrate.

8. The metasurface optical pulse shaper of claim 1, wherein the superpixels independently comprise:
a plurality of nanopillars disposed on the entry surface and spaced apart at a subwavelength distance,
wherein the nanopillars project from the entry surface opposite a direction of propagation of the primary frequency waves.

9. The metasurface optical pulse shaper of claim 8, wherein the nanopillars comprise a cross-sectional shape parallel to the entry surface that is circular to control phase of the phase waves.

10. The metasurface optical pulse shaper of claim 8, wherein the nanopillars comprise a cross-sectional shape parallel to the entry surface that is ellipsoidal or polygonal to control phase and amplitude of the phase waves.

11. The metasurface optical pulse shaper of claim 8, wherein superpixels independently comprise nanopillars that have a width parallel to the entry surface that is from 50 nm to 300 nm and a length orthogonal to the entry surface that is from 500 nm to 2000 nm.

12. The metasurface optical pulse shaper of claim 1, wherein the primary shape of the primary optical pulse comprises a femtosecond pulse.

13. A process for optically changing a pulse shape with a metasurface optical pulse shaper of claim 1, the process comprising:
dispersing a primary optical pulse into a plurality of primary frequency waves that comprises a primary frequency and a primary phase;
separating spatially by frequency the primary frequency waves;
receiving, by the superpixels, the primary frequency waves, individual superpixels receiving an individual primary frequency wave;
changing, by the superpixels, a relative phase of the primary frequency waves to produce shaped phases; and
producing, by the superpixels from the primary frequency waves, a plurality of phase waves that are separated spatially by frequency and phase, individual phase waves comprising:
the primary frequency of the primary frequency wave from which the phase wave was produced; and
a shaped phase, wherein at least one of the plurality of shaped phases is different among the shaped phases; and
producing, by the substrate, a plurality of shaped frequency waves such that, from an individual phase wave, a shaped frequency wave is produced and comprises:
the primary frequency, the shaped phase, and a shaped polarization,
the phase waves and shaped frequency waves being separated spatially by frequency and phase, such that a superposition of the shaped frequency waves produce a shaped optical pulse that comprises a secondary pulse shape,
the primary optical pulse comprising a primary shape that is different than the secondary pulse shape.

14. The process of claim 13, further comprising:
receiving, by a wire grid polarizer, the phase waves from the substrate;
controlling, by the wire grid polarizer, an amplitude of individual phase waves; and
producing, by the wire grid polarizer, the shaped frequency waves such that the phase waves are separated spatially by frequency, phase, and amplitude.

15. The process of claim 13, further comprising:
receiving, by a primary disperser in optical communication with the superpixels, the primary optical pulse;
spatially dispersing the primary optical pulse according to frequency; and
producing, from the primary optical pulse, the primary frequency waves.

16. The process of claim 13, further comprising:

receiving, by a grating, a primary optical pulse;

spatially dispersing the primary optical pulse according to frequency; and producing, from the primary optical pulse, the primary frequency waves; and receiving, by a mirror from the grating, the primary frequency waves;

focusing the primary optical pulse into a focal plane; and receiving, by the superpixels, the primary frequency waves in the focal plane of the mirror.

17. The process of claim 13, further comprising:

receiving, by a shaped disperser, the shaped frequency waves from the metasurface;

spatially combining the shaped frequency waves; and producing, from the combined shaped frequency waves, a shaped optical pulse, the shaped optical pulse, comprising a secondary shape that is different from the primary shape of the primary optical pulse.

18. The process of claim 13, further comprising:

receiving, by a mirror, the shaped frequency waves from the phase wave; and spatially focusing the shaped frequency waves into a focal plane;

receiving, by a grating, the shaped frequency waves in the focal plane of the mirror;

spatially combining the shaped frequency waves; and producing, by the grating from the shaped frequency waves, the shaped optical pulse.

19. The metasurface optical pulse shaper of claim 13, wherein the superpixels independently comprise:

a plurality of nanopillars disposed on the entry surface and spaced apart at a subwavelength distance, wherein the nanopillars project from the entry surface opposite a direction of propagation of the primary frequency waves.

20. The metasurface optical pulse shaper of claim 8, wherein the nanopillars comprise a cross-sectional shape parallel to the entry surface that is circular to control phase of the phase waves or ellipsoidal or polygonal to control phase and amplitude of the phase waves.

* * * * *